United States Patent [19]
Ota et al.

[11] Patent Number: 5,412,525
[45] Date of Patent: May 2, 1995

[54] TAPE CASSETTE HAVING A ROCKABLE FINGER FOR LATCHING A SLIDABLE SHUTTER

[75] Inventors: Shuichi Ota, Kanagawa; Akihiro Uetake, Tokyo; Takashi Sawada, Kanagawa; Kazuyoshi Suzuki, Tokyo, all of Japan

[73] Assignee: Sony Corporation, Tokyo, Japan

[21] Appl. No.: 79,255

[22] Filed: Jun. 3, 1993

[30] Foreign Application Priority Data

Jun. 19, 1992 [JP] Japan .................................. 4-160523
Nov. 17, 1992 [JP] Japan .................................. 4-305778

[51] Int. Cl.$^6$ .......................................... G11B 23/087
[52] U.S. Cl. ................................ 360/132; 242/347.1; 242/338.3
[58] Field of Search ................ 360/132; 242/197, 198, 242/199, 338, 338.1, 338.2, 338.3, 347.1

[56] References Cited

U.S. PATENT DOCUMENTS

| | | | |
|---|---|---|---|
| 4,572,461 | 2/1986 | Horikawa et al. | 360/132 |
| 4,660,784 | 4/1987 | Sumida et al. | 242/198 |
| 4,733,316 | 3/1988 | Oishi et al. | 360/132 |
| 4,742,415 | 5/1988 | Oishi | 360/132 |
| 4,775,911 | 10/1988 | Sato et al. | 360/132 |
| 4,850,547 | 7/1989 | Uemura | 242/198 |
| 4,881,137 | 11/1989 | Meguro et al. | 360/132 |
| 5,022,520 | 6/1991 | Yeol et al. | 242/197 |

FOREIGN PATENT DOCUMENTS

| | | | |
|---|---|---|---|
| 61-022485 | 1/1986 | Japan | 360/132 |
| 62-279574 | 12/1987 | Japan | 360/132 |
| 3-189979 | 8/1991 | Japan | 360/132 |
| 4-274071 | 9/1992 | Japan | 360/132 |

Primary Examiner—Stuart S. Levy
Assistant Examiner—Craig A. Renner
Attorney, Agent, or Firm—William S. Frommer; Alvin Sinderbrand

[57] ABSTRACT

A tape cassette has a substantially rectangular, box-shaped casing with a recess in a front portion of the casing having openings facing forwardly and downwardly, respectively, and with a bottom wall of the casing having an undersurface including cassette height determining portions adjacent the front and back of the casing and a slide surface portion therebetween which is planar and recessed relative to at least the cassette height determining portions adjacent the back of the casing. A lid is pivotally mounted on the casing for movements between a closed position extending across the opening facing forwardly from the recess and a raised opened position uncovering the forwardly facing opening, and a tape is wound about reels rotatable in the casing and extends between the reels in a path including a run extending across the forwardly facing opening so as to be disposed in back of the lid in its closed position. A shutter includes a lateral portion extending across the undersurface of the bottom wall and being slidable relative to the slide surface portion between a closed position in which the shutter closes the opening facing downwardly from the recess and a rearwardly displaced opened position uncovering such opening. The lateral portion of the shutter is dimensioned to be contained within the recessed slide surface portion in at least the opened position of the shutter so as to avoid any interference with access to the cassette height determining portions of the undersurface.

4 Claims, 18 Drawing Sheets

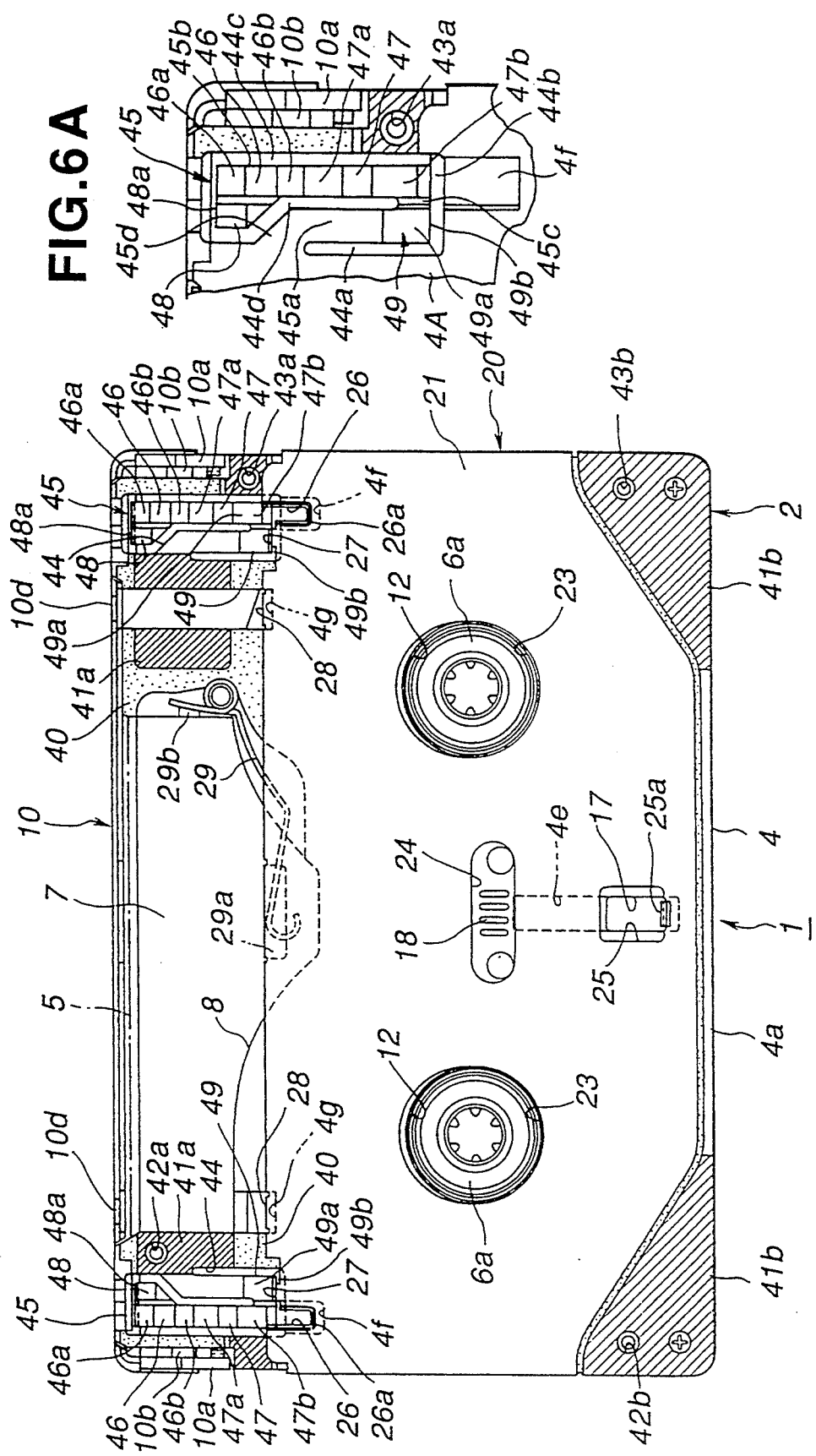

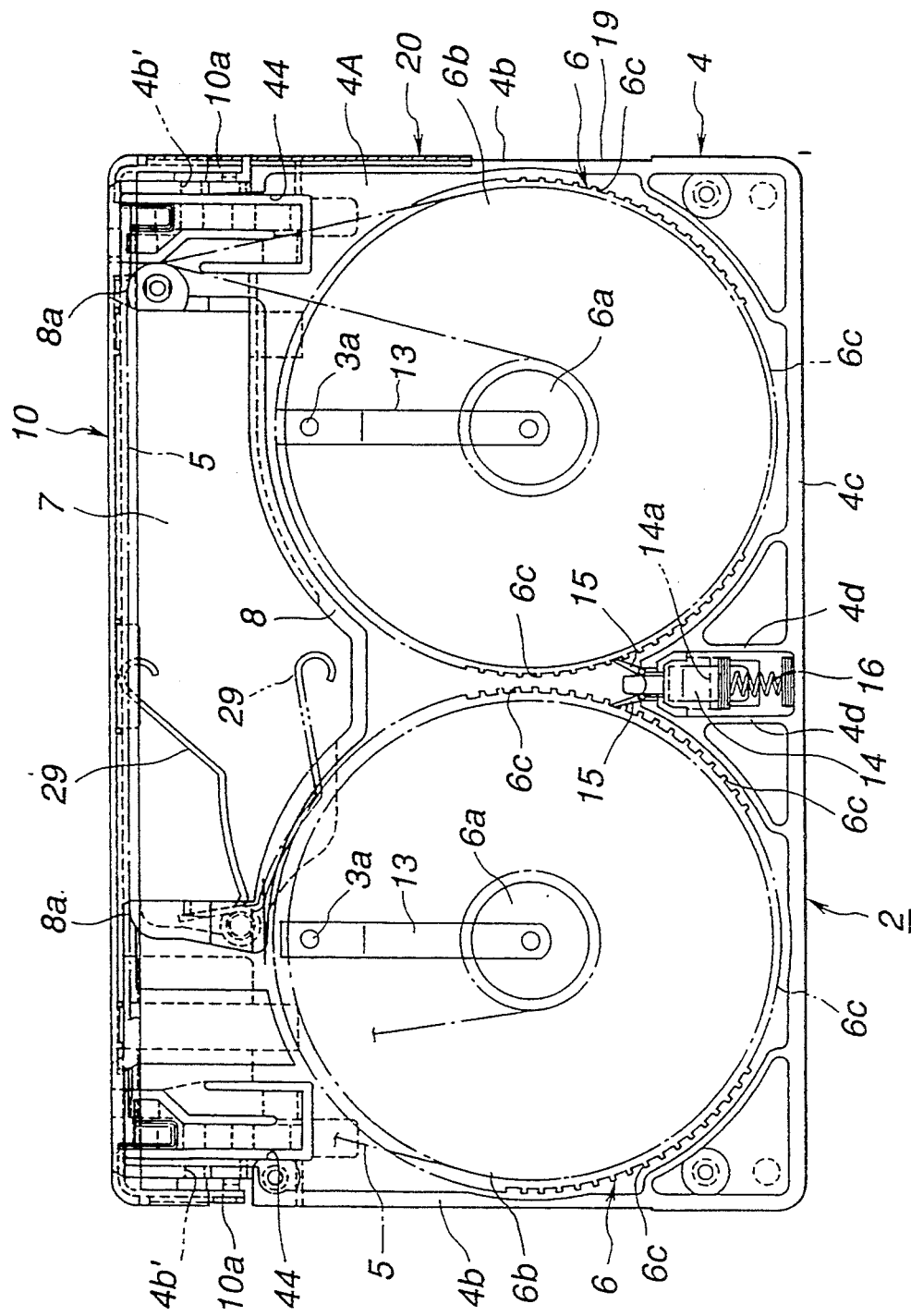

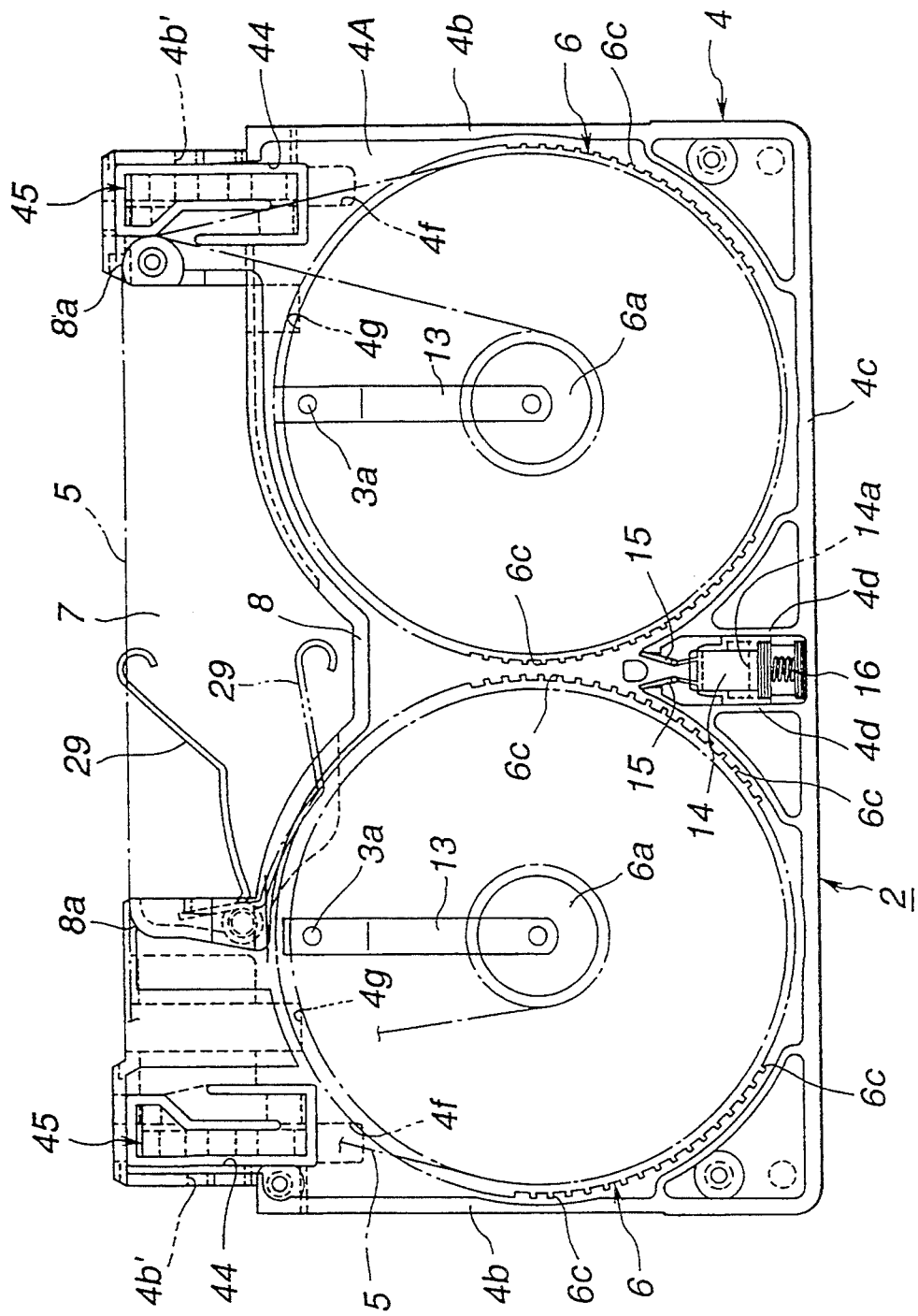

TAPE CASSETTE HAVING A ROCKABLE FINGER FOR LATCHING A SLIDABLE SHUTTER

BACKGROUND OF THE INVENTION

Field of the Invention

This invention relates generally to tape cassettes and, more specifically, is directed to a tape cassette of the type in which the cassette casing has a recess in a front portion thereof with openings therefrom facing forwardly and downwardly, respectively, a lid is pivotally mounted on the casing for movement between a closed position extending across the forwardly facing opening and a raised opened position uncovering the forwardly facing opening, a tape is wound about reels rotatable in the casing and extends between the reels in a path including a run extending across the forwardly facing opening so as to be disposed in back of the lid in its closed position, and a shutter is slidable relative to a bottom surface of the cassette casing between a closed position in which the shutter closes the opening facing downwardly from the recess and a rearwardly displaced opened position in which the downwardly facing opening is uncovered for providing access to the tape run.

Description of the Prior Art

Tape cassettes are known for digitally recording and reproducing data or information. Such cassettes generally include a casing having a recess at the front of the cassette casing with openings facing forwardly and downwardly, respectively, from such recess, a tape wound about a pair of reels rotatable within the casing and extending between such reels in a path having a run extending across the forwardly facing opening so as to be disposed in back of the lid in its closed position, and a shutter slidable relative to the bottom surface of the casing between a closed position in which the shutter closes the downwardly facing opening and a rearwardly displaced opened position uncovering the downwardly facing opening so that, with the lid also in its opened position, access may be had to the tape run so as to make possible recording or reproducing operations thereon.

More specifically, as shown in FIGS. 21 and 22, a so-called digital audio tape (DAT) cassette 100 includes a substantially rectangular, box-shaped casing 101 which may be formed of upper and lower shell portions joined by adhesive, ultrasonic welding or the like. A pair of reels 102 shown in dotted lines on FIG. 22 are rotatable within the casing 101, and a magnetic tape (not shown) is wound about the reels 102 and extends therebetween in a path having a run that extends across an opening facing forwardly from a recess 101b formed in the front portion of the casing 100. A lid 103 is pivoted on the casing 101 for movements between a closed position shown on FIGS. 21 and 22 in which the lid 103 covers the tape run extending across the forwardly facing opening from the recess 101b and an opened position swung upwardly from the position shown on FIG. 21, and in which the tape run extending across the forwardly facing opening of the recess 101b is uncovered or exposed. With the lid 103 in its opened position, access may be had to the tape run through a downwardly facing opening from the recess 101b for effecting digital recording and reproducing operations on the exposed tape.

In order to close the downwardly facing opening of the recess 101b and thereby protect the tape when the cassette 100 is not in use, the illustrated cassette according to the prior art is further shown to include a channel-shaped shutter 104 which is slidable relative to the bottom surface 101a of the casing 101 between a closed position shown on FIGS. 21 and 22 and an opened position (not shown) in which the shutter 104 is displaced rearwardly away from the front of the casing 101 so as to uncover the downwardly facing opening of the recess 101b. The shutter 104 is shown on FIG. 22 to have a pair of laterally spaced apart reel access openings 104a which, in the opened position of the shutter 104, register with corresponding reel access openings 102a formed in the bottom 101a of the casing 101, as shown in broken lines on FIG. 22. The undersurface of the shutter 104 is shown to have two laterally spaced apart grooves 104b formed parallel to the direction of movement of the shutter in the forward portion of the latter so as to be disposed laterally outward in respect to the recess 101b in the casing. As shown on FIGS. 22 and 23, each of the grooves 104b has a keeper opening 104c formed therein adjacent the back end of the respective groove, while a similar keeper opening 104d is formed in each groove 104b adjacent the forward end thereof. The front portion of the lid 103 has laterally spaced apart cut outs 103a formed in its lower edge so as to be aligned with the forward ends of the grooves 104b, respectively, when the lid 103 and shutter 104 are in their respective closed positions. At laterally spaced apart positions corresponding to the locations of the grooves 104b, the bottom 101a of the casing 101 has slots 101c for defining the sides and free ends of resilient latch fingers 101c. Each latch finger 101c has, at its free end, a depending locking nose or projection 101d which, in the closed position of the shutter 104 shown on FIG. 23, extends through the keeper opening 104c into the respective groove 104b for holding the shutter in its closed position. On the other hand, when the shutter is moved to its opened position, each nose or projection 101d extends through the keeper opening 104d into the respective groove 104b for holding the shutter 104 in its opened position against the force of a spring or other resilient means (not shown) providing for biasing the shutter 104 toward its closed position. Each locking nose or projection 101d is shown to have a beveled lower end so that a releasing element (not shown), when moved through the cutout 103a and along the respective groove 104b, can act on the beveled lower end of the nose or projection 101d for deflecting the latter upwardly out of the keeper opening 104c or 104d so as to permit movement of the shutter 104 between its closed and opened positions.

Although the resilient fingers 101c formed as integral parts of the bottom 101a of the casing 101 yieldably urge the respective locking noses or projections 101d to remain engaged in the keeper openings 104c or 104d until displaced upwardly therefrom by respective releasing elements, as described above, the known digital tape cassette described with reference to FIGS. 21-23 has a disadvantage in that vibrations generated during loading of the cassette into a recording and/or reproducing apparatus, such as, a DAT deck, a digital VCR, or the like, may cause the locking noses or projections 101d to become disengaged from the respective keeper openings 104c or 104d. Further, the shutter 104 must be thick enough to allow for the formation therein of the elongated grooves 104b, which thereby limits the extent to which the thickness of the shutter 104 may be reduced. Further, the need to provide the shutter 104 with a substantial thickness limits the designers freedom of choice in producing the described cassettes. For example, if it is desired to form the shutter 104 of metal, such metal would have to be undesirably thick so as to accommodate the grooves 104b therein. Further, if the shutter 104 is formed of metal while the casing 101 is molded of a synthetic resin, the hard metal of the shutter may scratch or scrape material from the casing during repeated movements of the shutter between its opened and closed positions. On the other hand, limiting the choice of material for the shutter 104 to a synthetic resin also restricts the designers freedom in producing the tape cassette.

The known digital tape cassette described above with reference to FIGS. 21-23 is further disadvantageous in that, when the shutter 104 is closed, the condition of the tape extending across the opening facing forwardly from the recess 101b cannot be readily determined by a user. In other words, with the lid 103 and the shutter 104 in their closed positions, the user cannot determine whether the tape extending between the reels 102 is slack.

OBJECTS AND SUMMARY OF THE INVENTION

Accordingly, it is an object of the present invention to provide digital tape cassettes which are free of the mentioned disadvantages of the cassettes according to the prior art.

More specifically, it is an object of the present invention to provide a digital tape cassette with a shutter which may be formed of metal or synthetic resin, as desired.

Another object of the invention is to provide a digital tape cassette, as aforesaid, in which the condition of the tape extending across an opening at the front of the cassette casing may be readily determined by the user without opening either the lid or shutter of the tape cassette.

Still another object of present invention is to provide a digital tape cassette, as aforesaid, in which the shutter is reliably locked in either its closed or opened position until such locking action is intentionally released.

In accordance with an aspect of this invention, a tape cassette comprises a substantially rectangular, box-shaped casing including top and bottom walls, peripheral walls extending between the top and bottom walls at the back and opposite sides of the casing and a partition defining a recess in a front portion of the casing which has openings facing forwardly and downwardly, respectively, from the recess, the bottom wall of the casing having an undersurface including cassette height determining portions adjacent the front and back of the casing and a planar slide surface portion disposed substantially between the cassette height determining portions and being recessed relative to at least the cassette height determining portions adjacent the back of the casing; a lid pivotally mounted on the casing for movements between a closed position extending across the opening facing forwardly from the recess in the front portion of the casing and a raised opened position uncovering the forwardly facing opening; a pair of reels rotatable within the casing; a tape wound about the reels and extending between the latter in a path including a run extending across the forwardly facing opening so as to be disposed in back of the lid in the closed position of the latter; and a shutter including a lateral portion extending across the undersurface of the bottom wall and being slidable relative to the slide surface portion between a closed position in which the shutter closes the opening facing downwardly from the recess and a rearwardly displaced opened position uncovering the opening facing downwardly from the recess, such lateral portion of the shutter being dimensioned to be contained within the recessed slide surface portion in at least the opened position of the shutter so as to avoid any interference with access to the cassette height determining portions of the undersurface.

In accordance with another aspect of this invention, a tape cassette, as aforesaid, comprises retaining means for holding the shutter in each of the opened and closed positions thereof including upstanding abutments at a front edge of the shutter and latching fingers integral with the bottom wall of the casing and extending generally parallel to a direction in which the shutter is slidably movable, such latching fingers having stop surfaces facing forwardly and rearwardly, respectively, for selective engagement with the abutments on the shutter so as to hold the shutter in the closed or opened position, respectively. Further, the latching fingers are resiliently rockable in opposite directions relative to the bottom wall of the casing for selectively freeing the forwardly and rearwardly facing stop surfaces from the abutments on the shutter, and means are integral with the latching fingers for rocking the latter in the opposite directions upon insertion and removal of the cassette into and from a holder therefor so that the shutter is freed to be moved to its opened position upon insertion of the cassette in the holder and the shutter is freed to be returned to its closed position upon removal of the cassette from the holder.

Further, in accordance with a feature of this invention, reel locking means are provided in the casing for preventing rotation of the reels when the cassette is not in use, the bottom wall of the casing has an opening for access to the reel locking means by a lock releasing member, and the shutter has an opening which, in the opened position of the shutter, is aligned with the opening in the bottom wall so that the lock releasing member, when inserted through the opening in the bottom wall for releasing the reel locking means, also engages in the opening of the shutter for locking the latter in its opened position.

The above, and other objects, features and advantages of the invention, will be apparent in the following detailed description of illustrative embodiments of the invention when read in connection with the accompanying drawings in which corresponding parts are identified by the same reference numerals in the several views of the drawings.

BRIEF DESCRIPTION OF THE DRAWINGS

FIG. 6 is a bottom plan view of the tape cassette of FIG. 1 showing the shutter in its opened position, and further showing cassette height determining portions and a slide surface portion at the underside of the bottom wall of the cassette casing;

FIG. 6A is an enlarged fragmentary bottom plan view corresponding to a portion of FIG. 6, but with the shutter removed for exposing details of retaining means provided for selectively holding the shutter in its opened and closed positions;

FIG. 7 is a top plan view of the tape cassette of FIG. 1 shown with the top wall of its casing removed and with reels within the casing in a locked condition;

FIG. 8 is a view similar to that of FIG. 7, but with a lid of the cassette also being removed, and showing the reels in a released or unlocked condition;

DETAILED DESCRIPTION OF THE PREFERRED EMBODIMENTS

Figure 1:
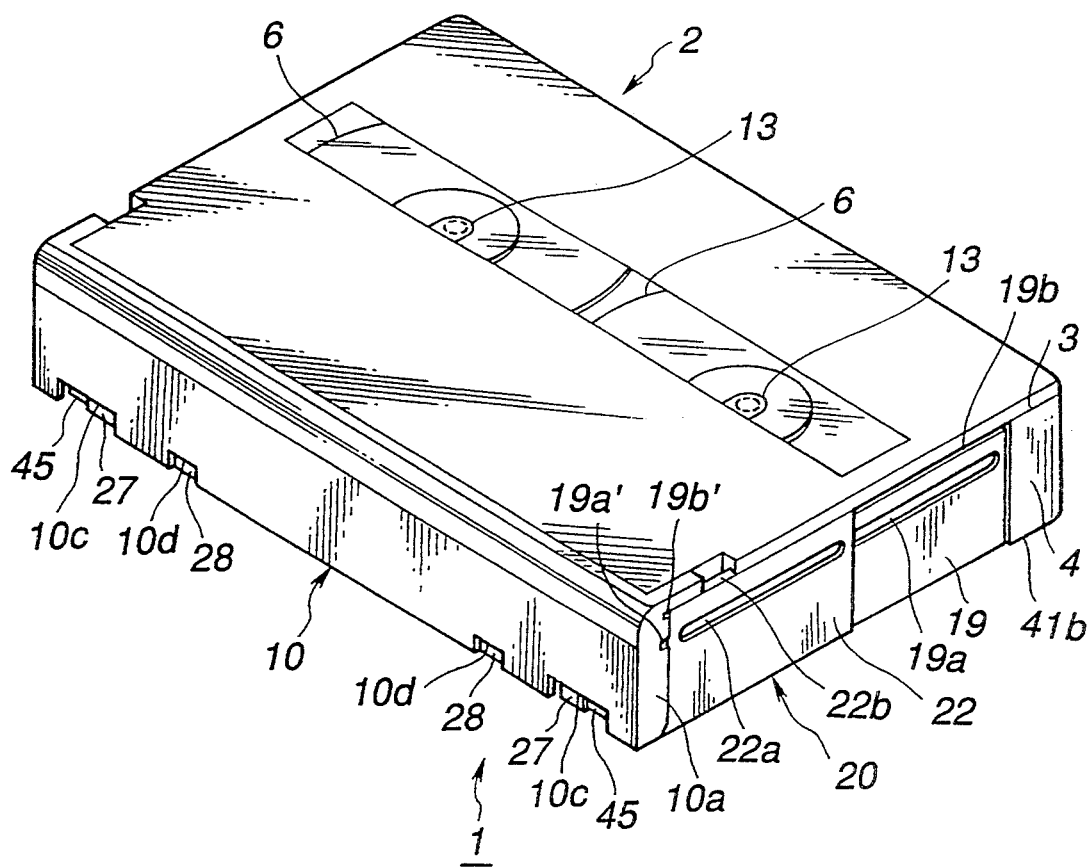
FIG. 1 is a perspective view of a shutter-type tape cassette according to an embodiment of this invention.

Referring to the drawings in detail, and initially to FIGS. 1–4 thereof, it will be seen that the present invention is there embodied in a digital audio tape (DAT) cassette 1 which generally comprises a substantially rectangular, box-shaped casing 2 composed of upper and lower shells 3 and 4 desirably molded or otherwise formed of a synthetic resin. The upper shell 3 forms a top wall of the casing 2, while the lower shell 4 forms the bottom wall 4A of the casing and has peripheral walls 4b and 4c extending upwardly from the bottom wall 4A at the opposite sides and the back, respectively, of the casing 2. A partition 8 (FIGS. 7 and 8) extends upwardly along a cut-out front edge portion of the bottom wall 4A to define a recess 7 in the front portion of the casing 2. The top wall 3 of the casing extends forwardly over the recess 7 so that the latter has openings facing forwardly and downwardly, respectively, from the recess 7. The end portions of the partition wall 8 are directed forwardly at opposite sides of the recess 7 and terminate in tape guides 8a having at least part-cylindrical surfaces. A pair of tape reels 6 are rotatably disposed in side-by-side relation within the casing 2, and a magnetic tape 5 is wound on the reels 6 and extends between the latter in a path defined at least in part by the tape guides 8a so as to include a run extending across the forwardly facing opening of the recess 7, as particularly shown on FIG. 8.

Figure 9:
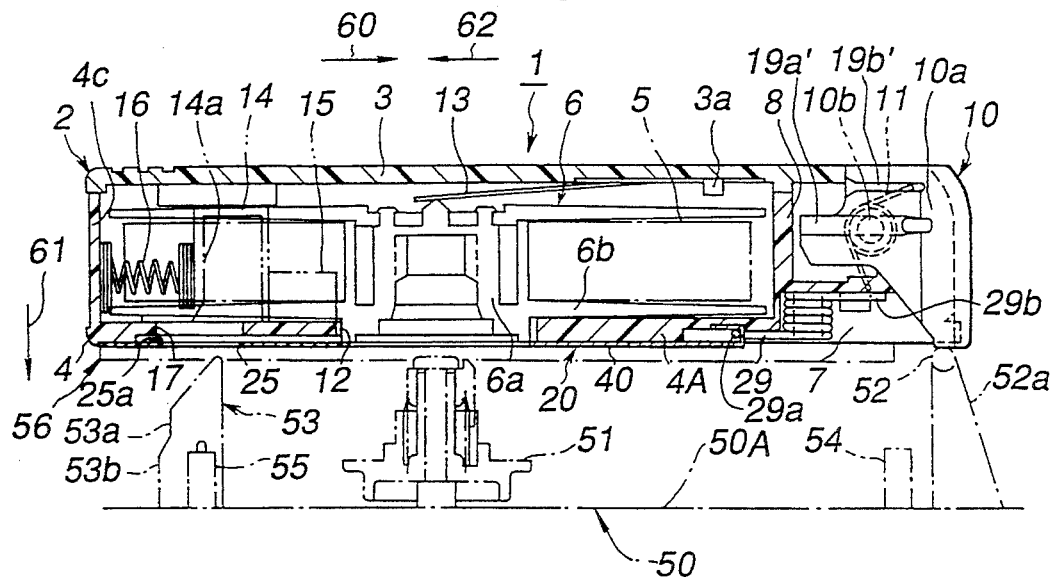
FIG. 9 is an enlarged sectional view taken along the line IX—IX on FIG. 3, and showing the cassette with its shutter in the opened position thereof in preparation for the downward movement of the cassette to a loaded or operative position on a recording and/or reproducing device.

A lid 10 which extends across the front of the casing 2 is desirably molded or otherwise formed of a synthetic resin and includes right-angled end portions 10a at the opposite ends thereof. Such end portions 10a are provided with inwardly directed pins 10b (FIGS. 6 and 6A) which engage in holes 4b' formed in inwardly offset forward end portions of the peripheral walls 4b at opposite sides of the casing. Thus, the lid 10 is pivotally mounted on the casing 2 for movements between a closed position (FIG. 9) in which the lid extends across the opening facing forwardly from the recess 7 in the front portion of the casing, and a raised opened position (FIG. 10) in which the forwardly facing opening as well as the run of the tape 5 extending thereacross are uncovered. A torsion spring 11 extends around at least one of the pins 10b which pivotally mounts the lid 10 on the casing 10 for yieldably urging the lid toward its closed position (FIG. 9).

As shown on FIG. 6, the bottom wall 4A of the casing 2 has a pair of laterally spaced apart circular access openings 12 formed therein for providing access to hubs 6a of the reels 6, respectively. Leaf springs 13 (FIGS. 7–10) are mounted, at one end, on bosses 3a depending from the top wall 3, and the other or free ends of the springs 13 bear downwardly on the hubs 6a of the reels 6, respectively. Therefore, when the cassette 1 is not in use, lower flanges 6b of the reel 6 rest upon the upper surface of the bottom wall 4A, as particularly shown on FIG. 9. The lower flanges 6b of the reels 6 are formed with teeth 6c around the outer circumference thereof for cooperation with a reel lock member 14 in preventing rotation of the reels 6 when the cassette 1 is not in use.

More specifically, as shown on FIGS. 7 and 8, upstanding, parallel guide wall portions 4d which are laterally spaced apart on the central portion of the bottom wall 4A extend forwardly from the back wall 4c, and the reel lock member 14 is slidable in fore and aft directions between the guide wall portions 4d. The reel lock member 14 is provided, at its forward end, with divergent resilient pawls 15 for engaging the teeth 6c on the reel flanges 6b when the reel lock member 14 is in a forward or locking position. A helical compression spring 16 is interposed between the reel lock member 14 and the back wall 4c between the guide wall portions 4d for urging the reel lock member 14 forwardly to its locking position. The reel lock member 14 is formed with a downwardly opening recess 14a which, in all positions of the reel lock member 14, registers, at least in part, with a rectangular reel lock releasing hole 17 formed in the bottom wall 4A of the casing 2 (FIGS. 6 and 9–12). The pawls 15 and the teeth 6c on the flanges 6b of the reels are angled so that, when the reel lock member 14 is in its forward or locking position, the engagement of the pawls 15 with the teeth 6c prevents turning of the reels 6 in the unwinding directions so as to avoid slackening of the magnetic tape 5 between the reels. However, when the recess 14a of the reel locking member 14 is engaged through the hole 17 for moving the reel locking member 14 rearwardly against the force of the spring 16, as hereinafter described in detail, the resilient pawls 15 are flexed toward each other by engagement with the forward ends of the guide walls 4d (FIG. 8) so as to disengage the pawls 15 from the teeth 6c and thereby free the reels 6 for rotation.

Figure 2:
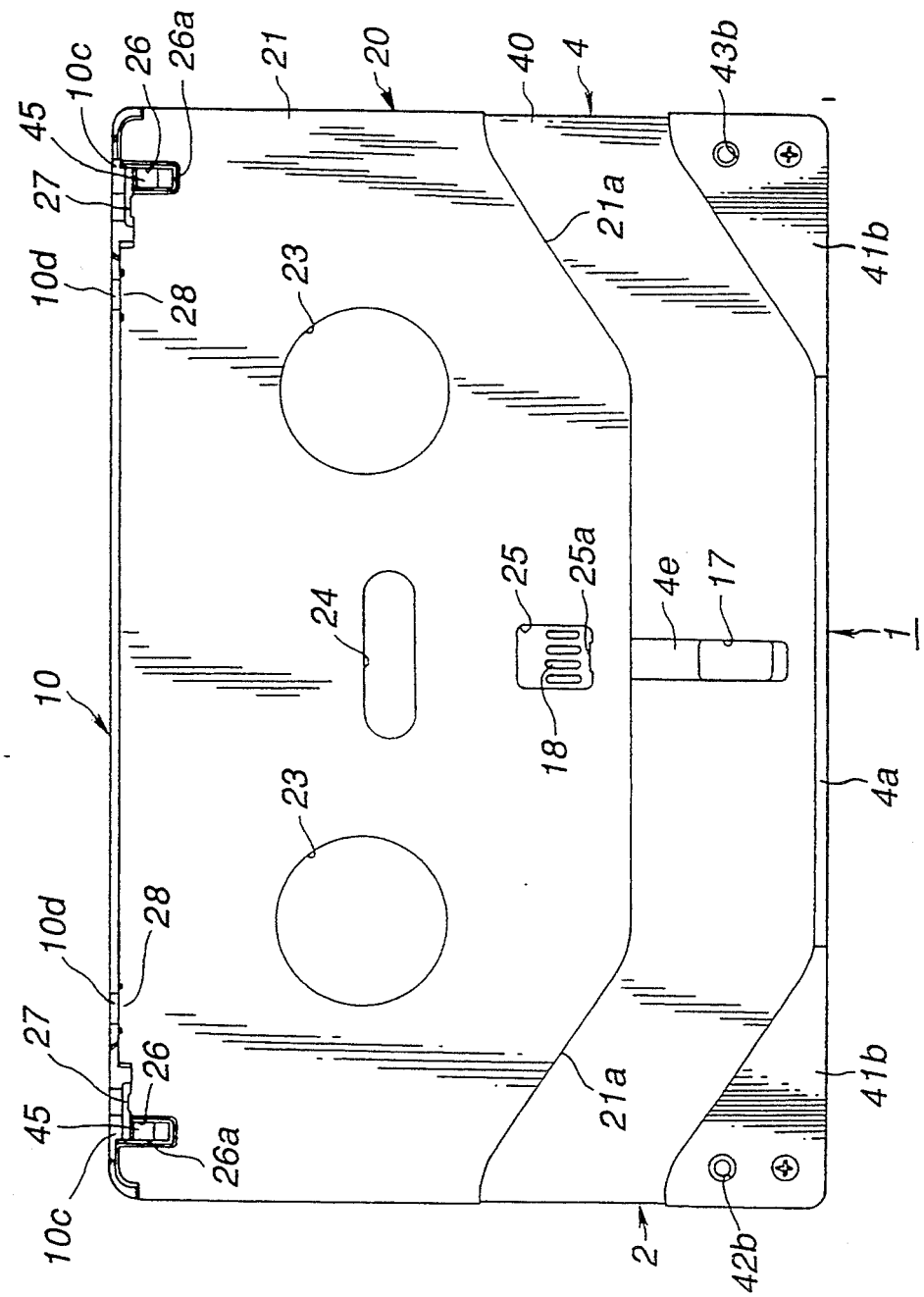
FIG. 2 is a bottom plan view of the tape cassette of FIG. 1.
Figure 3:
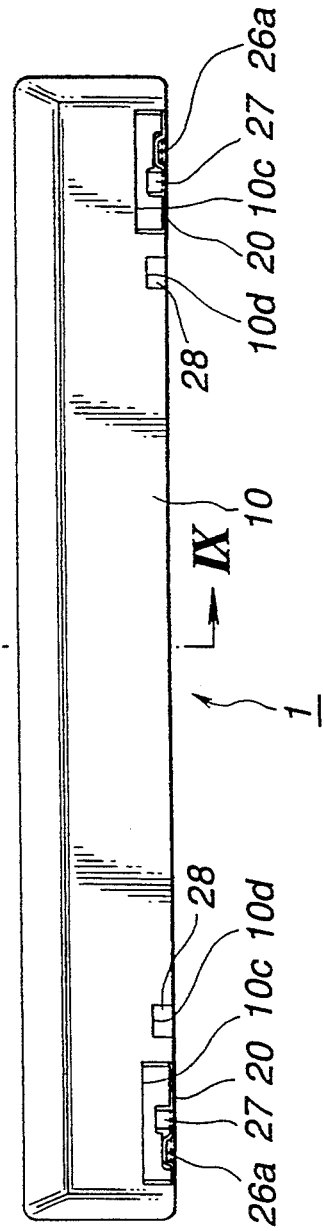
FIG. 3 is a front elevational view of the tape cassette of FIG. 1.

Further, as best seen on FIG. 2, a terminal 18 for contact with an IC memory portion (not shown) of a recording and/or reproducing device intended for use with the cassette 1 may be embedded in the underside of the bottom wall 4A of the casing at a location approximately midway between the openings 12 provided for access to the reel hubs 6a.

Figure 4:
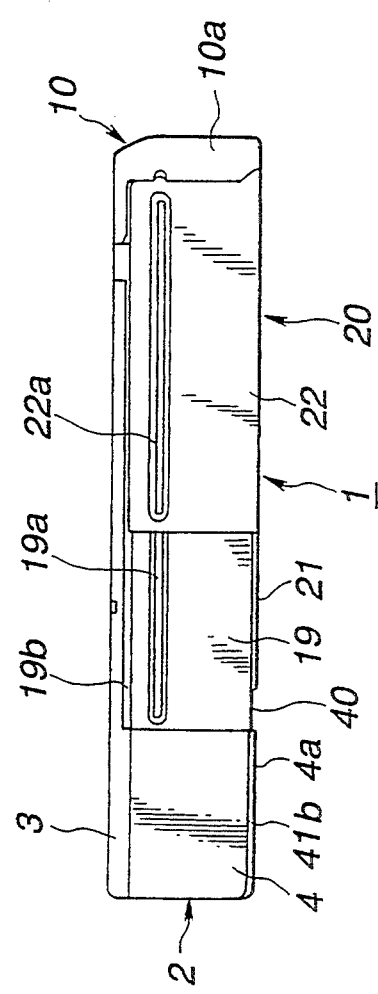
FIG. 4 is a side elevational view of the tape cassette of FIG. 1.

As is shown particularly on FIG. 2, when the cassette 1 is not in use, the downwardly facing opening of the recess 7 is closed by a shutter 20. In the embodiment of the invention being here described, the shutter 20 is formed of sheet metal or the like and, as viewed from the front, is generally U-shaped and includes a planar bottom portion 21 and side portions 22 extending upwardly along the opposite sides of the bottom portion 21 (FIGS. 1 and 4). The outer surfaces of the side walls 4b of the casing 2 and the contiguous outer surfaces of the side portions 10a of the lid 10 are recessed to provide shutter receiving surfaces 19 along which the side portions 22 of the shutter 20 are slidable. An inwardly indented elongated bead or ridge 22a is formed along each of the side portions 22 of the shutter 20 and is slidable in an elongated guide groove 19a formed in the respective shutter receiving surface 19. Further, the upper edge of each of the side portions 22 is bent inwardly to form a flange 22b (FIG. 1) which is slidably engaged in an elongated groove 19b extending along the upper margin of the respective shutter receiving surface 19. Continuations of the grooves 19a and 19b extend into the portions of the recessed shutter receiving surfaces 19 formed on the side portions 10a of the lid 10, as at 19a' and 19b' (FIGS. 1 and 9). Therefore, when lid 10 and shutter 20 are in their respective closed positions, the engagement of beads 22a and flanges 22b in the groove portions 19a' and 19b' of the lid 10 serves to lock the latter in its closed position.

As shown particularly on FIG. 2, the rear corners of the bottom portion 21 of the shutter 20 are cut-out or angled, as at 21a, and the bottom portion 21 of the shutter 20 is slidable in respect to a slide surface portion 40 of the undersurface 4a of the bottom wall 4A, as represented by dotted shading on FIG. 6. The slide surface portion 40 has a rear margin that generally corresponds to the configuration of the rear edge of the bottom portion 21 of the shutter. Further, height determining portions 41a and 41b are provided at front and rear corners, respectively, of the undersurface 4a, and are indicated by diagonal shading on FIG. 6, and the slide surface portion 40 extends between the height determining portions 41a and 41b and is recessed relative to at least the height determining portions 41b adjacent the back of the casing 2. The front height determining portions 41a are provided with left-side and right-side cassette positioning holes 42a and 43a, and the rear height determining portions 41b are provided with left-side and right-side cassette positioning holes 42b and 43b, respectively. The height determining portions 41a and 41b may all be in a common plane, or, as in the embodiment being described, the plane of the height determining portions 41a at the front of the cassette may be higher than that of the rear height determining portions 41b provided that positioning pins engageable in the holes 42a and 43a are at correspondingly different heights from positioning pins engagable with the holes 42b and 43b, as hereinafter described.

As further shown on FIG. 6, the bottom portion 21 of the shutter 20 is formed with reel access holes 23, a laterally elongated hole 24 and a rectangular coupling hole 25 at respective positions registering with the access openings 12, the IC memory terminal 18 and the reel lock releasing hole 17, respectively, when the shutter 20 is in its opened position shown on FIG. 6. The coupling hole 25 is shown to be formed with a bent or folded over rear edge 25a to provide a bearing surface that can be acted upon for locking the shutter 20 in its opened position, as hereinafter described in detail. The undersurface 4a of the bottom wall 4A is formed with a fore and aft extending groove 4e which is laterally dimensioned and located similarly to the hole 17 and is of sufficient depth so as to loosely receive the folded over edge portion 25a of the coupling hole 25. By reason of the foregoing, the folded over edge portion 25a on the shutter 20 moves freely along the groove 4e without damage to the material of the casing 2 upon movement of the shutter 20 between its opened and closed positions.

As shown particularly on FIG. 2, cut-outs 26 are formed in the forward edge portion of the shutter 20 adjacent the opposite sides of the latter. Portions of the front edge of the shutter 20 disposed laterally inward in respect to the cut-outs 26 are bent upwardly to form upstanding abutments 27. At locations spaced inwardly from the abutments 27, the front edge of the shutter 20 is further bent upwardly to form relatively taller upstanding abutments 28. A torsion spring 29 has opposite ends acting against anchors 29a and 29b (FIGS. 6 and 9) on the shutter 20 and the casing 2, respectively, for urging the shutter 20 in the forward direction, that is, to its closed position (FIG. 2) in which the shutter covers the downwardly facing opening of the recess 7.

As shown particularly on FIGS. 6 and 6A, latching fingers 45 are provided as integral parts of the bottom wall 4A of the casing at the opposite forward corners thereof. Each of the latching fingers 45 is defined by a pattern 44 of slots 44a, 44b, 44c and 44d (FIG. 6A) so as to include first and second elongated elements 45a and 45b extending side-by-side parallel to the direction of movement of the shutter 20 and being joined to each other at their back ends, as at 45c. The forward end portion of the element 45a is joined to the remainder of the bottom wall 4A of the casing, as at a connecting neck 45d, while the forward end of the element 45b projects beyond the forward end of the element 45a and terminates in a laterally offset portion 48 aligned with the element 45a. Stop surfaces 48a and 49b face forwardly and rearwardly, respectively, on the laterally offset portion 48 at the forward end of the element 45b and on the back end portion 49 of the element 45a, respectively. The stop surfaces 48a and 49b of each latching finger 45 are laterally situated for alignment with the abutment 27 on the respective side portion of the front edge of the shutter 20. The element 45b of each latching finger 45 is laterally situated so as to be aligned with the cut-out 26 formed in the respective side of the forward edge portion of the shutter 20.

As shown particularly on FIGS. 13(a)–13(d), the element 45b of each of the latching fingers 45 has, at its underside, a first protruding cam 46 with front and rear oppositely sloping surfaces 46a and 46b and a second protruding cam 47 with front and rear oppositely sloping surfaces 47a and 47b, respectively. The cams 46 and 47 are arranged in tandem, that is, one after the other along the element 45b, so as to be engageable from below through the respective cut-out 26 in the forward edge portion of the shutter 20 as the latter is moved between its closed and opened positions. As further shown on FIGS. 13(a)–13(d), the offset portion 48 of each of the latching fingers 45 has an inclined bottom surface 48b sloping upwardly and rearwardly from the respective stop surface 48a. Similarly, the end portion 49 of the element 45a has an inclined lower surface 49a sloping upwardly and forwardly from the stop surface 49b. As hereinafter described in greater detail, each of the latching fingers 45 is adapted to be rockably flexed about its connecting neck 45d (FIG. 6A), for example, from the rest position shown on FIG. 13(a) to the rocked position shown on FIG. 13(b), or from the rest position shown on FIG. 13(c) to the oppositely rocked position shown on FIG. 13(d). In the normal unflexed or rest condition of each latching finger 45 shown in FIG. 13(a), the stop surface 48a engages in back of the respective abutment 27 at the front edge of the shutter 20 for holding the shutter in its closed position. In the rocked position of the latching finger 45 shown in FIG. 13(b), the stop surface 48a is released from the respective abutment 27 so that the shutter 20 is then free to be displaced rearwardly to its opened position where, as shown on FIG. 13(c), the abutment 27 engages in back of the stop surface 49b for retaining the shutter in its opened position. Upon the flexing of the latching finger 45 to the rocked position shown on FIG. 13(d), the stop surface 49b is disengaged from the respective abutment 27 so that the spring 29 can then act on the shutter 20 for returning the latter to its closed position.

As shown in FIGS. 6A and 13(a)–13(d), an elongated recess or groove 4f is formed in the underside of the bottom wall 4A of the casing and extends from the slot 44b in alignment with the element 45b of each latching finger 45. Each elongated recess or groove 4f is dimensioned and located so that, in the opened position of the shutter 20 shown on FIG. 13(c), the raised rim or lip 26a extending around each cut-out 26 will be accommodated in the respective recess 4f. Further, at positions inboard relative to the grooves or recesses 4f, undersurface 4a of the casing 2 is formed with grooves 4g (FIG. 6) which are aligned with the abutments 28 at the front edge of the shutter 20 so that such abutments 28 can move along the respective grooves 4g during movements of the shutter 20 between its opened and closed positions. As shown on FIGS. 1 and 3, the lid 10 is formed with a pair of cut-outs 10c and a pair of cut-outs 10d in the lower edge of the lid at locations corresponding to the cut-outs 26 and adjacent abutments 27, in the case of the cut-outs 10c, and at locations corresponding to the abutments 28 in the case of the cut-outs 10d.

Figure 10:
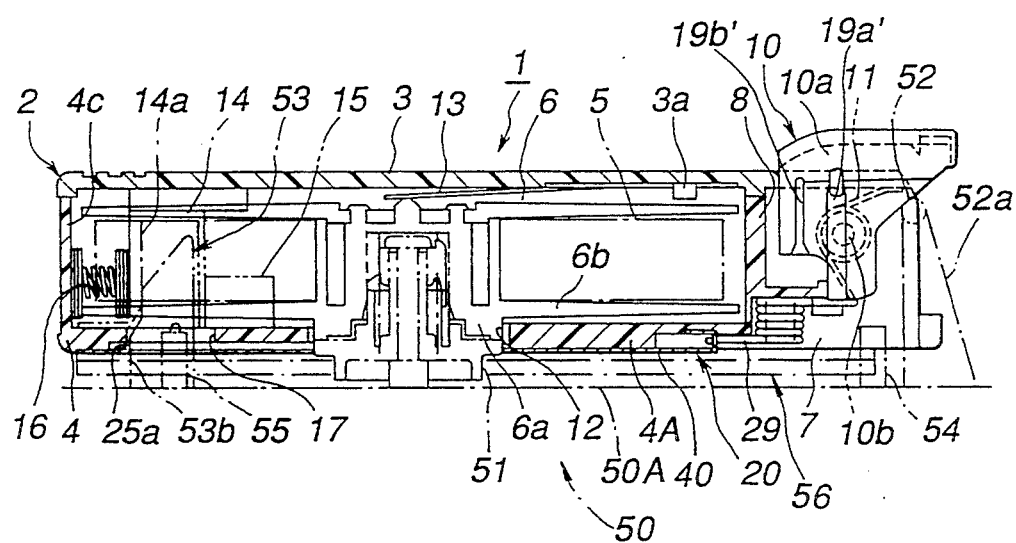
FIG. 10 is a view similar to that of FIG. 9, but showing the cassette in its loaded or operative position, and with its pivoted lid moved to the opened position thereof.

As shown in dot-dash lines on FIGS. 9 and 10, a recording and/or reproducing device 50 of a type with which the cassette 1 is intended to be used may include a chassis 50A having a pair of rotatable reel tables or spindles 51 projecting upwardly therefrom and being laterally spaced apart so as to extend upwardly through the access holes 23 in the shutter 20 in the open position of the latter, and then through the access openings 12 in the bottom wall 4A of the casing 2 and into coupling engagement with the hubs 6a of the reels 6 when the cassette 1 is moved downwardly from an elevated position shown on FIG. 9 to the operative or loaded position shown on FIG. 10 for the commencement of a recording or reproducing operation on the tape 5. The operative or loaded position of the cassette 1 shown in FIG. 10 is determined by front and rear positioning pins 54 and 55, respectively, projecting upwardly from the chassis 50A and being respectively engageable in the holes 42a and 43a formed in the height determining portions 41a, and in the holes 42b and 43b formed in the height determining portions 41b of the undersurface 4a of the casing 2. It will be appreciated that, with the shutter 20 in its opened position shown in FIG. 6, the height determining portions 41a and 41b at the front and back of the cassette casing 2 are all accessible to be engaged with the respective positioning pins 54 and 55. It is further to be noted that, when the positioning pins 54 and 55 are thus engaged, the casing 2 is vertically positioned so that the reel spindles or tables 51 lift the engaged reels 6 for raising the lower flanges 6b of the reels from the bottom wall 4A, as shown on FIG. 10.

Further, as shown on FIGS. 9 and 10, a lid opening member 52, for example, in the form of a pin, is mounted on a support 52a a suitable distance above the chassis 50A so as to engage a corresponding end portion 10a of the lid 10 for pivoting the latter against the force of torsion spring 11 from its closed position shown on FIG. 9 to its opened position shown on FIG. 10 as the cassette 1 is moved downwardly to its operative or loaded position.

Figure 5:
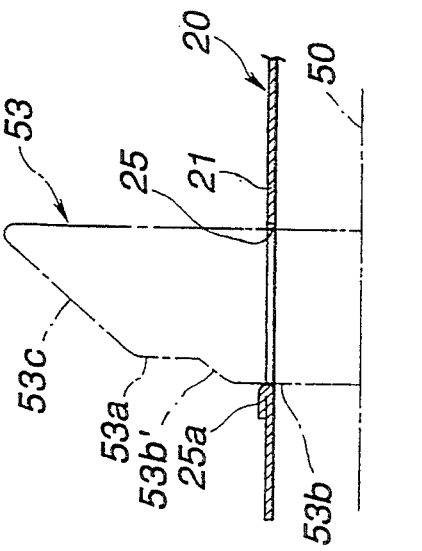
FIG. 5 is an enlarged fragmentary cross sectional view of a portion of a metal shutter included in the tape cassette of FIG. 1, and which is shown engaged by a reel-lock releasing member of a recording and/or reproducing device with which the tape cassette is intended to be used.

Also projecting upwardly from the chassis 50A is a reel lock releasing member 53 which is positioned to extend upwardly through the coupling hole 25 in the shutter 20, and through the rear lock releasing hole 17 in the bottom wall 4A of the casing 2 into the recess 14a of the reel lock member 14 when the cassette 1, having its shutter 20 previously opened, is moved downwardly to its operative or loaded position shown on FIG. 10. More specifically, as shown on FIG. 5, the lock releasing member 53 includes an upper end portion having an inclined or tapering back surface 53c which, as the cassette 1 is initially moved downwardly from the position shown on FIG. 9, first projects through the registered holes 17 and 25 into the recess 14a of the reel lock member 14 and acts against the back surface of the recess 14a for rearwardly displacing the rear lock member 14 against the force of the spring 16. The upper inclined surface 53c of the member 53 leads to a vertical portion 53a which is received in the recess 14a of the rear lock member 14 when the cassette 1 is in its operative or loaded position (FIG. 10), and which establishes a released condition of the locking member 14 in which the resilient pawls 15 are flexed toward each other by engagement with forward ends of the guide walls 4d so as to disengage the pawls 15 from the teeth 6c and thereby free the reels 6 for rotation. The reel lock releasing portion 53a of the member 53 leads, through an inclined step 53b', to a base or shutter locking portion 53b of the member 53. As shown particularly on FIG. 5, when the cassette 1 is in its operative or loaded position in respect to the chassis 50A, the shutter locking portion 53b of the member 53 extends upwardly in the coupling hole 25 of the shutter 20 and engages the bent or folded rear edge 25a to further displace the shutter 20 rearwardly a small distance from its opened position as defined by engagement of the abutments 27 on the shutter 20 with the stop surfaces 49b on the latching fingers 45.

As is conventional, the cassette 1 is inserted, for example, slidably in the direction of the arrow 60 on FIG. 9, into a suitable cassette holder 56 represented in dot-dash lines on FIGS. 9 and 10, while the cassette holder is in the elevated cassette receiving and ejecting position shown on FIG. 9. Thereafter, the cassette holder 56 is suitably moved downwardly, for example, in the direction of the arrow 61, to the position shown on FIG. 10, so as to deposit the cassette 1 on the positioning pins 54 and 55 and thereby dispose the cassette in its operative or loaded position.

As earlier noted, in the cassette 1 embodying this invention, the shutter 20 is automatically moved from its closed position to its opened position shown on FIG. 9 in response to the insertion of the cassette 1 into the cassette holder 56. In order to effect such opening of the shutter 20, the holder 56 is provided with cam engaging projections 57 positioned for alignment with the elements 45b of the latching fingers 45, and also with shutter actuating members 58 positioned for engagement with the abutments 28 at the front edge of the shutter. Starting with the shutter 20 locked in its closed position, as shown on FIG. 13(a), it will be seen that, as the cassette 1 is slidably inserted in the direction of the arrow 60 into the cassette holder 56, each cam engaging projection 57 on the holder 56 extends through the respective recess 26 and engages the sloping surface 46a of the cam 46 for rocking the respective latching finger 45 to the position shown on FIG. 13b, whereby to release the stop surface 48a from the respective abutment 27 at the front edge of the shutter 20. As the insertion of the cassette into the holder 56 continues, each shutter actuating member 58 acts rearwardly against the respective abutment 28 for displacing the shutter 20 rearwardly relative to the casing 2 of the cassette. Upon the completion of the insertion of the cassette 1 into the cassette holder 56, as shown on FIG. 13(c), each shutter actuating member 58 will have moved the respective abutment 28 sufficiently to the rear for disposing the shutter 20 in its opened position, and each cam engaging projection 57 will have moved out from under the cam 47 on the respective latching finger 45 to permit the return of the latter to its normal position at which the stop surface 49b is engageable, from in front, with the respective abutment 27 for retaining the shutter 20 in its opened position against the force of the spring 29 acting thereon. Thus, shutter 20 is retained in its opened position on the cassette 1 carried by the holder 56 as it is moved from the elevated position of FIG. 9 to the operative or loaded position of FIG. 10.

Figure 11:
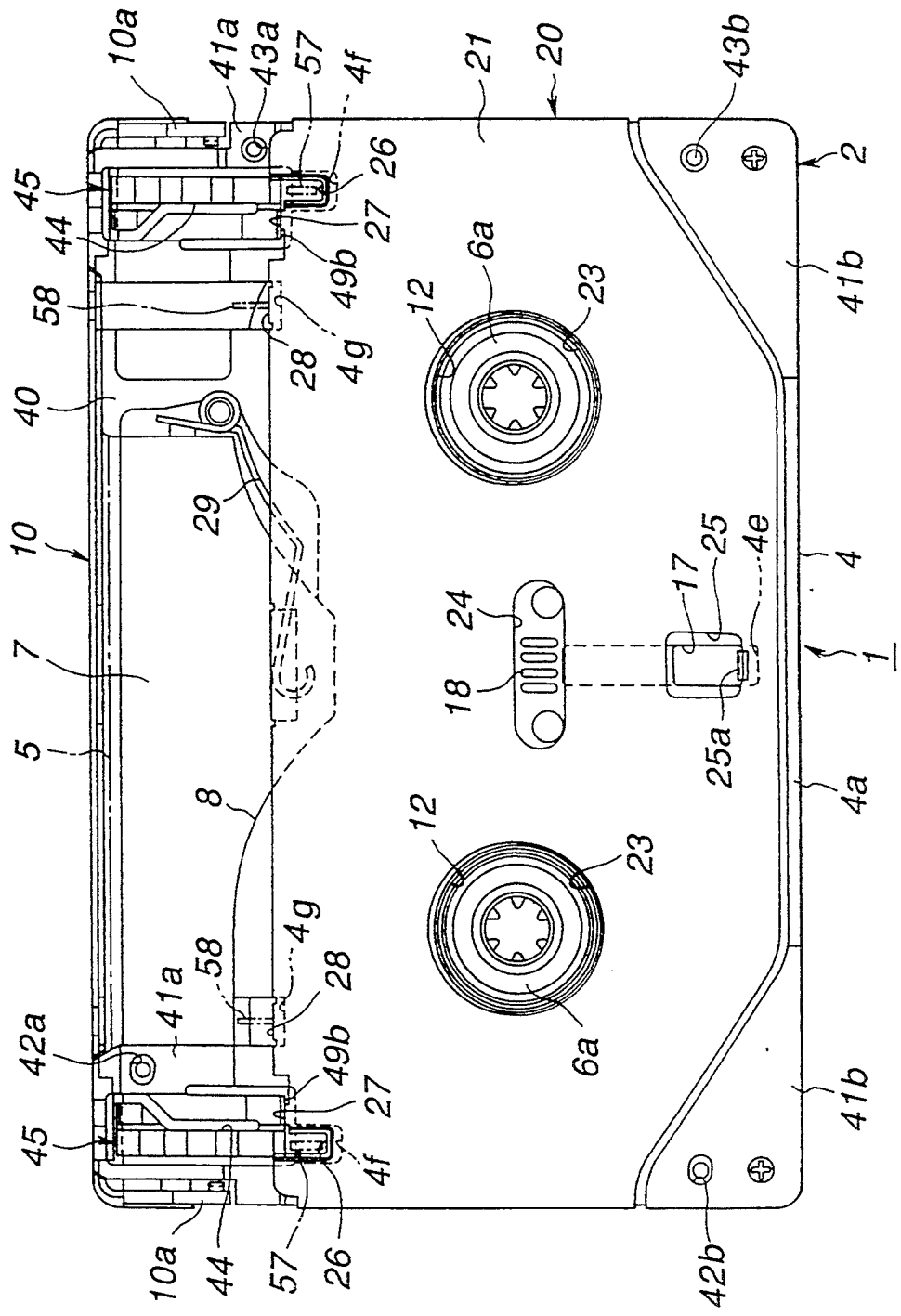
FIG. 11 is a bottom plan view of the cassette with its shutter held in an opened position, as in FIG. 9.
Figure 12:
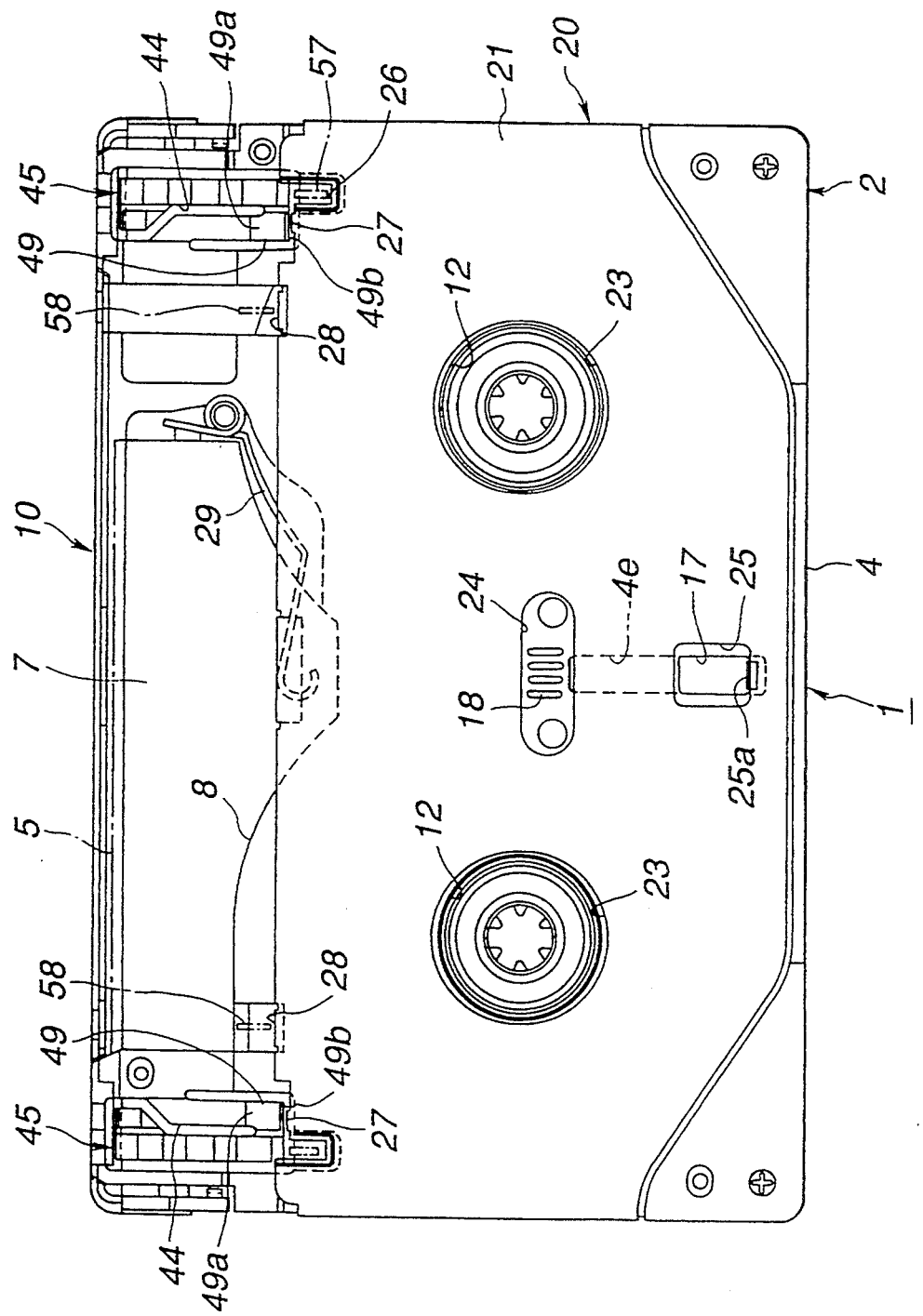
FIG. 12 is a view similar to that of FIG. 11, but with the cassette having its shutter locked in the opened position, as in FIG. 10.
Figure 13:
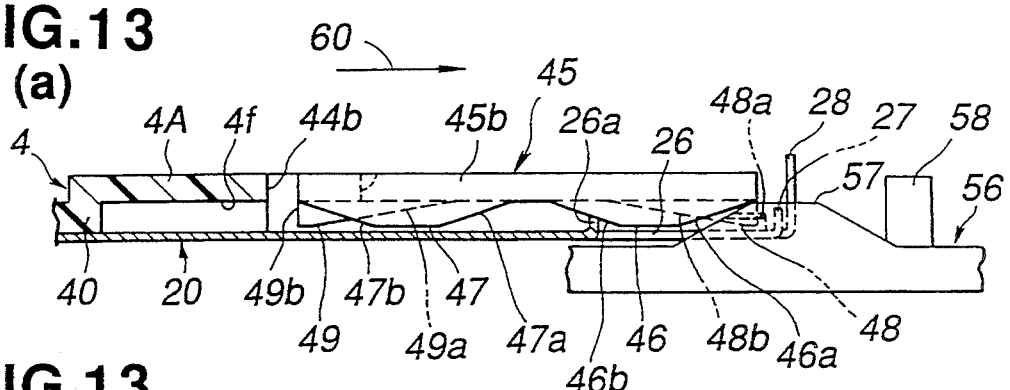
FIGS. 13(a)–13(d) are enlarged fragmentary sectional views showing successive stages in the movements of the shutter between its closed and opened positions in response to the movements of the cassette of FIG. 1 into and out of a cassette holder therefor.
Figure 13:
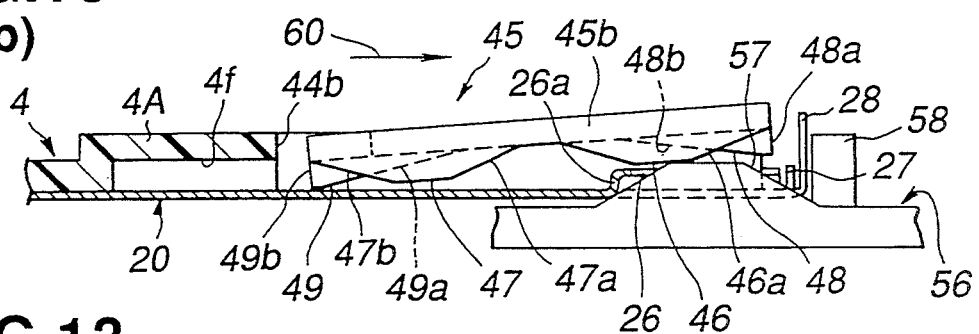
Figure 13:
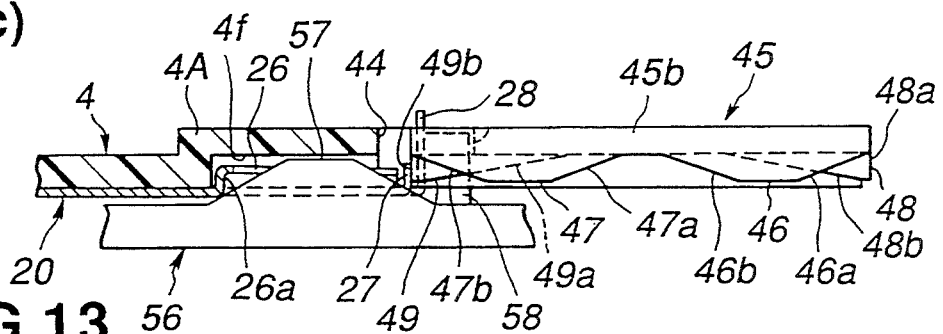
Figure 13:
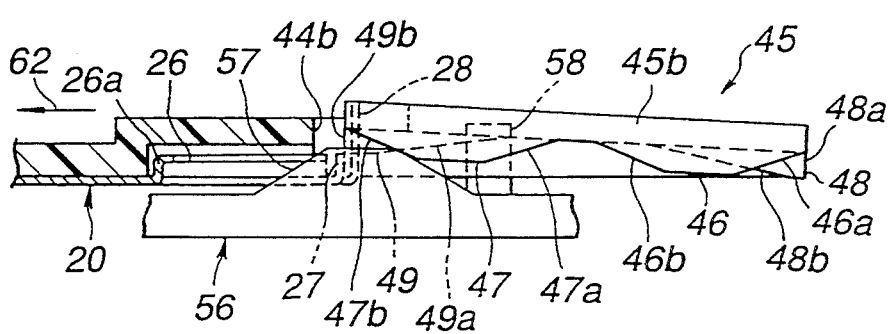

As earlier noted, when the cassette 1 is in its operative or loaded position shown on FIG. 10, the base portion 53b of the lock releasing member 53 acts against the folded over rear edge 25a of the coupling hole 25 in the shutter 20 for further displacing the shutter a small distance rearwardly, for example, from the position shown on FIG. 11 to the position shown on FIG. 12, and thereby slightly spacing the abutments 27 at the forward edge of the shutter from the stop surfaces 49b. Thus, during a recording or reproducing operation, the metal abutments 27 will not wear or deform the resilient latching fingers 45 which, in the embodiment being described are desirably formed of synthetic resin.

Upon the completion of a recording or reproducing operation, the cassette holder 56 is suitably returned to its elevated position shown on FIG. 9. In the course of the upward movement of the cassette 1 to such elevated position, the lid 10 is freed from the lid opening member 52, and hence can be returned to its closed position by the spring 11. When the cassette holder 56 attains its elevated position, the cassette 1 may be ejected or slidably withdrawn therefrom in the direction of the arrow 62. As noted on FIG. 13(d), movement of the cassette housing in the direction of the arrow 62 relative to the holder 56 causes each projection 57 on the holder to act against the cam 47 on the respective latching finger 45 for rocking the latter in the direction to free the respective stop surface 49b from the corresponding abutment 27 whereupon the spring 29 can return the lid 20 to its closed position as the withdrawal of the cassette 1 from the holder 56 is completed. At such time, the various parts are returned to the relative positions shown on FIG. 13(a) in which the abutments 27 at the front edge of shutter 20 are engageable against the stop surfaces 48a of the respective latching fingers 45 for retaining the shutter 20 in its closed position. Further, with the shutter 20 in its closed position, the bead 22a and flange 22b on each side portion of the shutter 20 engage in the groove extensions 19a' and 19b', respectively, formed in the adjacent end portion 10a of the lid 10 for also locking the latter in its closed position. Therefore, upon the withdrawal of the cassette 1 from the holder 56, both the lid 10 and the shutter 20 are locked in their closed positions for fully protecting the tape 5 within the casing 2.

Since the base portion 53b of the lock releasing member 53 securely locks the shutter 20 in its opened position when the cassette is in its operative or loaded position shown on FIG. 10, inadvertent or accidental closing of the shutter 20 with the cassette 1 in the operative or loaded position, for example, as a result of impacts or vibrations, is securely prevented.

Further, since the shutter 20 is formed of metal in the embodiment of the present invention being described, the thickness of the shutter 20 is substantially reduced. By providing the coupling hole 25 with the folded over rear edge 25a against which the base portion 53b of the lock releasing member 53 is engageable, and by providing the undersurface 4a of the bottom wall 4A of the casing with the groove 4e in which the folded over edge 25a is freely movable, there is no chance that the metal shutter 20 will scrape the lower shell 4 of the cassette casing 2 during repeated opening and closing movements of the shutter.

It is also to be noted that, since the portion 53a of the lock releasing member 53 performs the function of securing the reel lock member 14 in its released position and the portion 53b of the member 53 performs the function of securely locking the shutter 20 in its opened position so long as the cassette 1 is in its operative or loaded position shown on FIG. 10, the single member 53 performs dual functions so as to reduce the number of parts required and thereby simplify the structure and correspondingly reduce the cost of the recording and-/or reproducing device 50 with which the shutter 1 embodying this invention is to be used.

Figure 14:
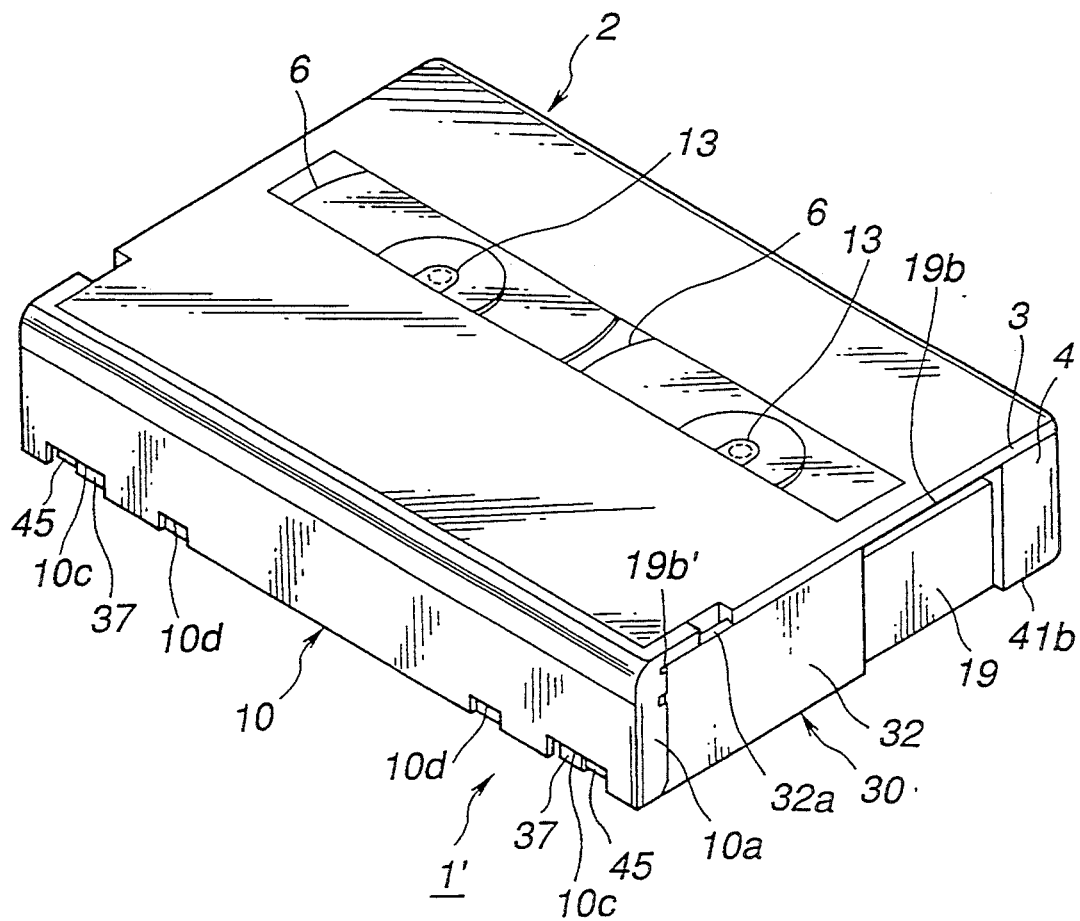
FIG. 14 is a perspective view similar to that of FIG. 1, but showing a shutter-type tape cassette according to a second embodiment of the invention.
Figure 15:
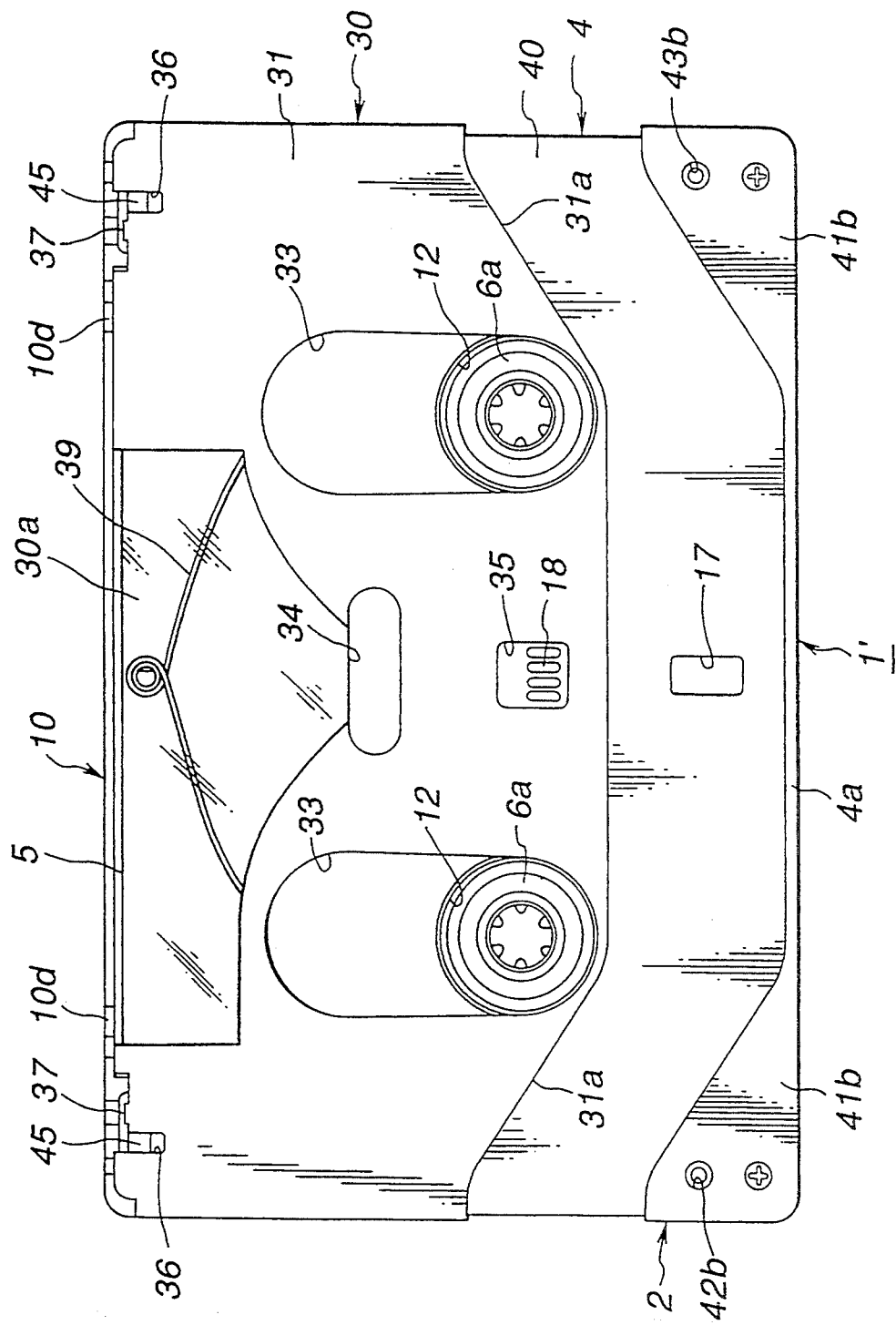
FIG. 15 is a bottom plan view of the tape cassette of FIG. 14.
Figure 16:
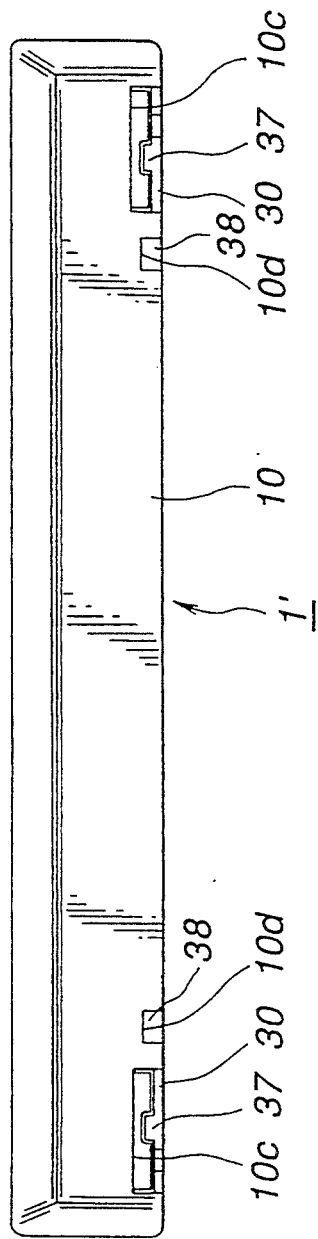
FIG. 16 is a front elevational view of the tape cassette of FIG. 14.

Referring now to FIGS. 14–20, it will be seen that a shutter-type tape cassette 1' according to a second embodiment of this invention has a casing 2 and a lid 10 which are the same as the casing 2 and lid 10 of the previously described embodiment, and which have their several parts identified by the same reference numerals. The tape cassette 1' substantially differs from the previously described tape cassette only in respect to its shutter 30 which is molded of a synthetic resin so as to include a planar bottom portion 31 and side portions 32 extending upwardly along the opposite sides of the bottom portion 31 (FIGS. 14 and 15). The outer surfaces of the side walls 4b of the casing 2 of the tape cassette 1' and the contiguous outer surfaces of the side portions 10a of the lid 10 are again recessed to provide shutter receiving surfaces 19 along which the side portions 32 of the shutter 30 are slidable. An inwardly directed flange 32a is molded along the upper edge of each of the side portions 32 and is slidably engageable in the elongated groove 19b extending along the upper margin of the respective shutter receiving surface 19 and in the continuation 19b' of the groove 19b extending into the portion of the recessed surface 19 formed on the adjacent side portion 10a of the lid 10.

Figure 17:
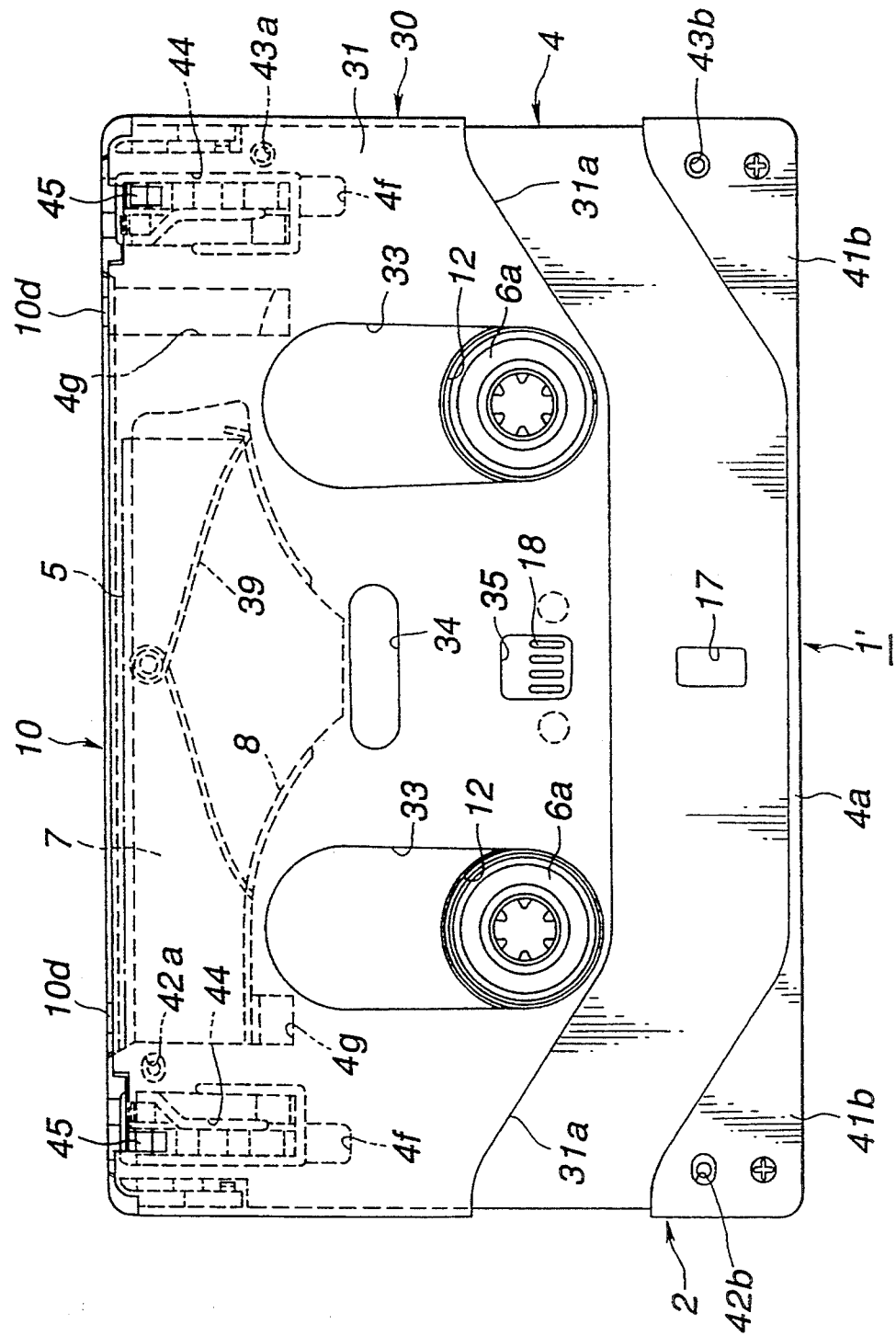
FIG. 17 is a view similar to that of FIG. 15, but with the shutter of the cassette being formed entirely of an opaque synthetic resin, and with underlying structures of the cassette being shown in dotted lines.
Figure 18:
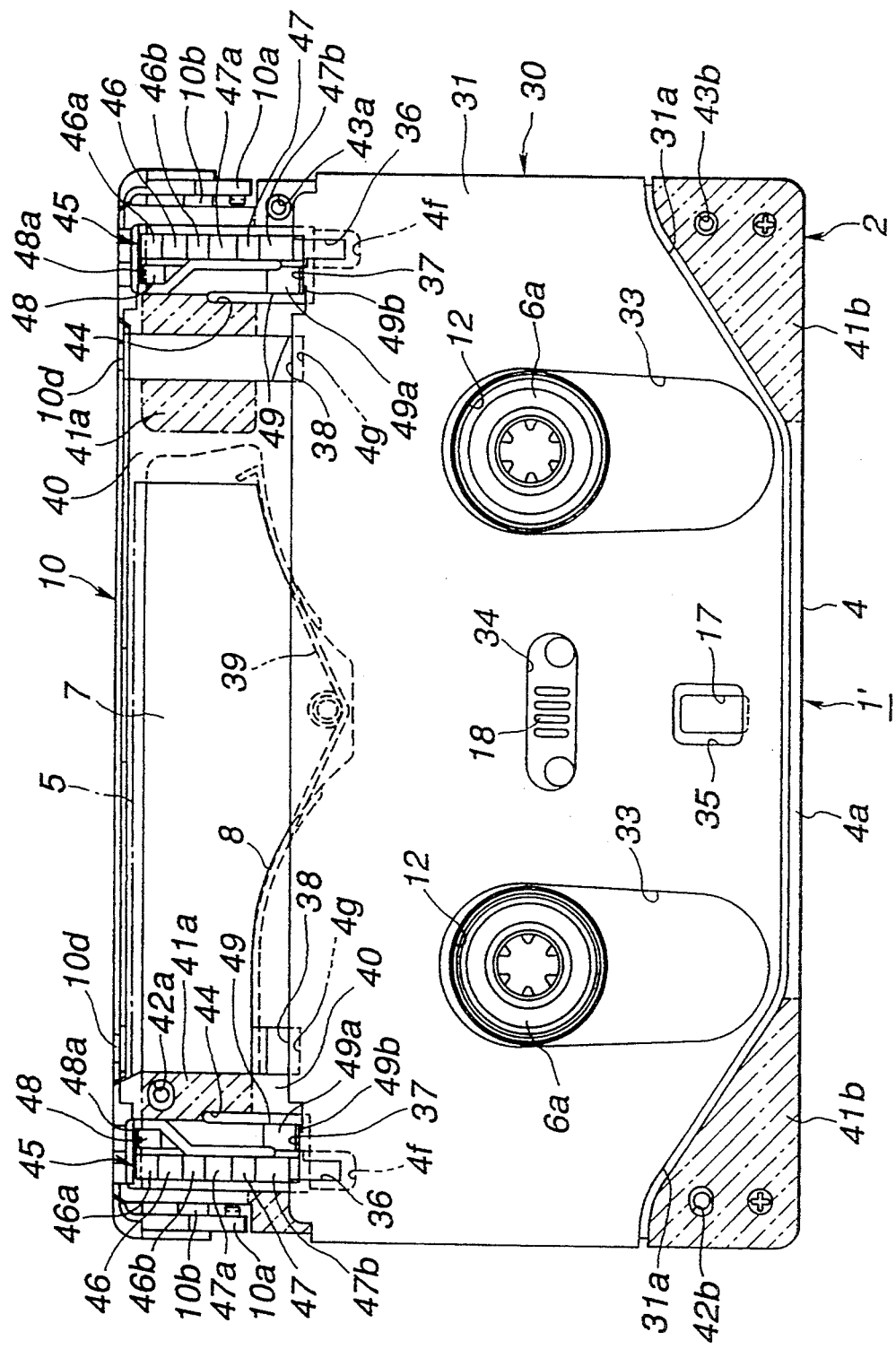
FIG. 18 is a view similar to that of FIG. 17, but with the shutter being shown in its opened position.
Figure 19:
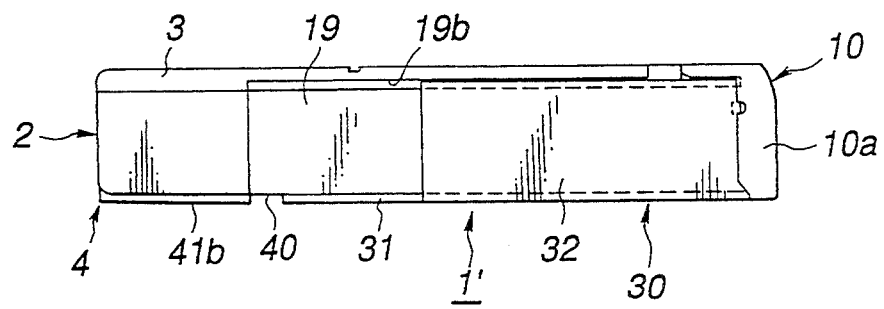
FIG. 19 is a side elevational view of the cassette of FIG. 14.
Figure 20:
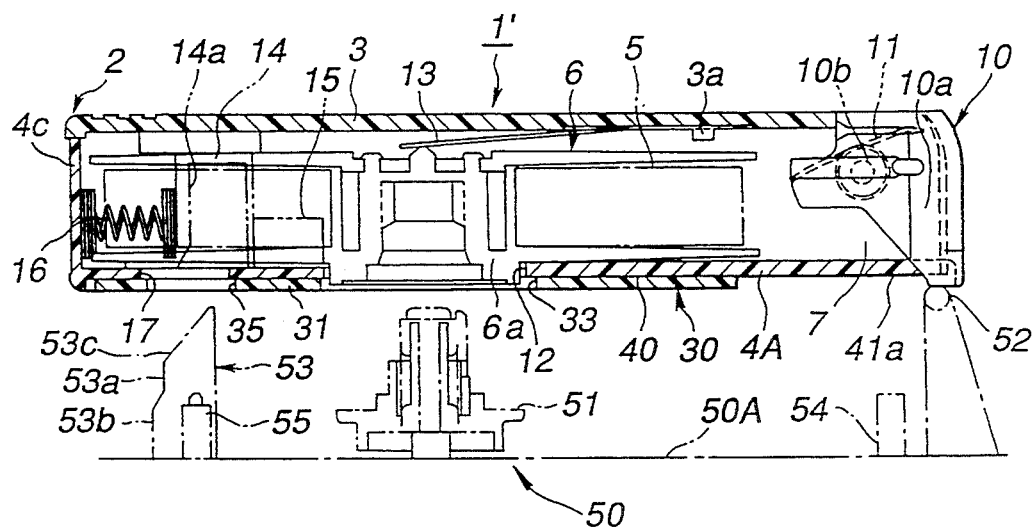
FIG. 20 is a sectional view similar to that of FIG. 9, but showing the cassette of FIG. 14.
Figure 21:
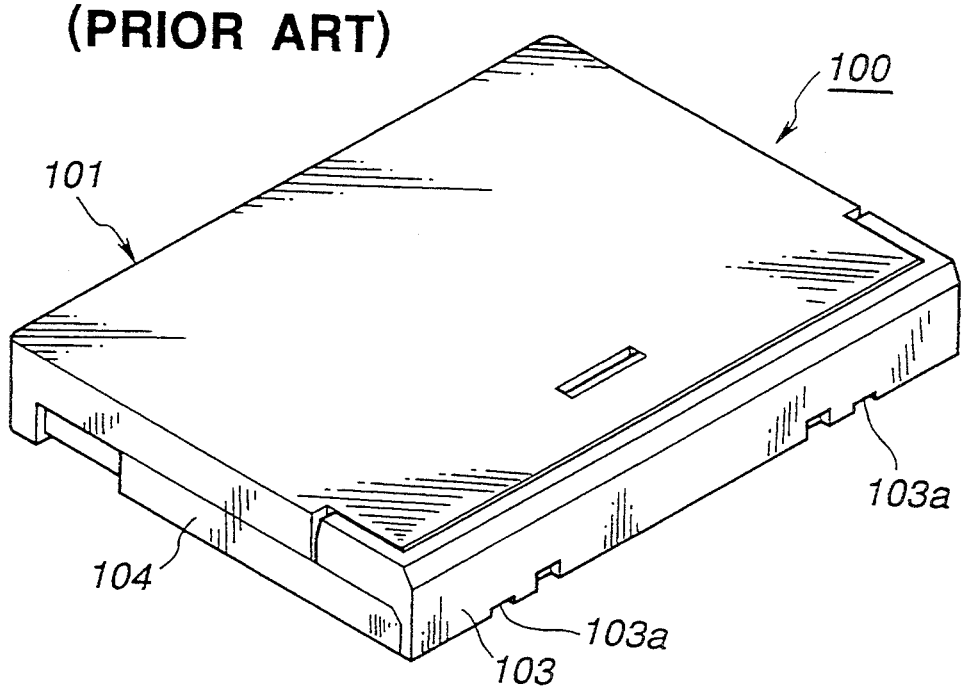
FIG. 21 is a perspective view of a shutter-type tape cassette according to the prior art.
Figure 22:
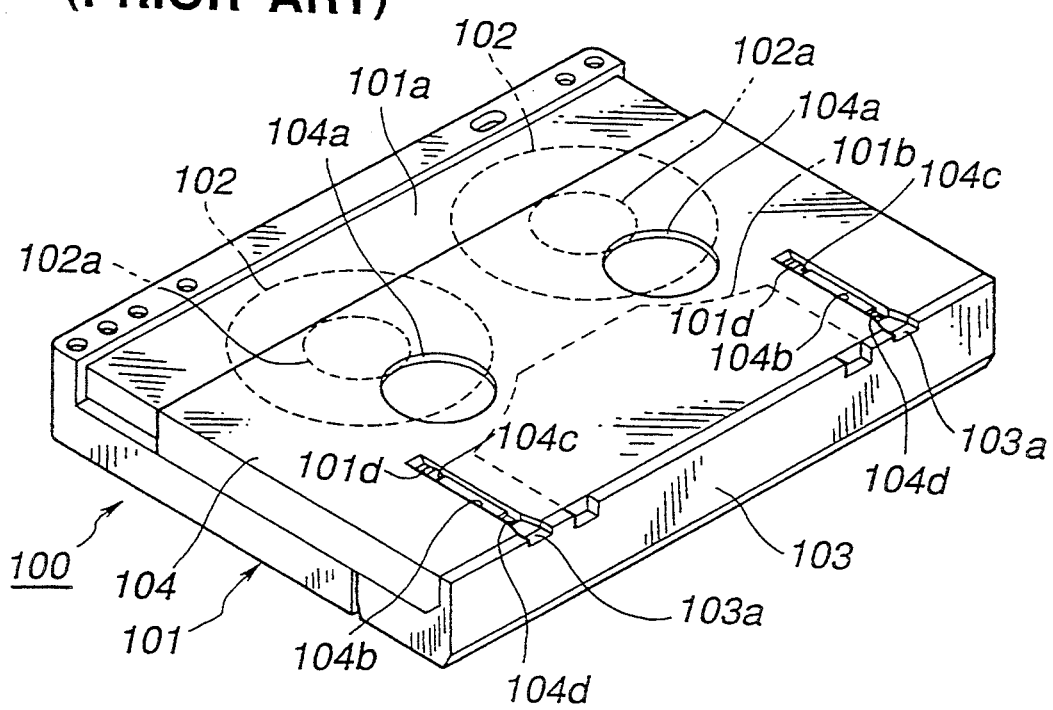
FIG. 22 is a perspective view of the tape cassette of FIG. 21 as viewed from the underside.
Figure 23:
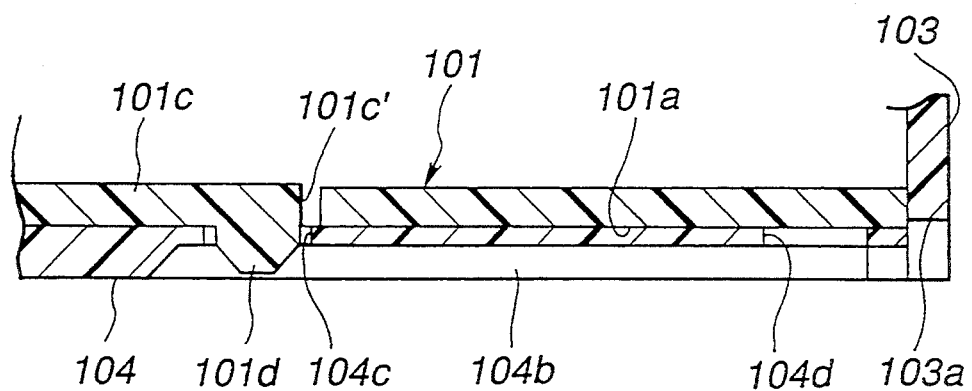
FIG. 23 is an enlarged fragmentary sectional view illustrating the structure provided in the tape cassette of FIGS. 21 and 22 for holding the shutter thereof in its closed and opened positions.

As shown particularly on FIGS. 15, 17 and 18, the rear corners of the bottom portion 31 of the shutter 30 are cut-out or angled, as at 31a, and the bottom portion 31 of the shutter 30 is slidable in respect to a slide surface portion 40 of the undersurface 4a of the bottom wall 4A. The slide surface portion 40 is shown to have a rear margin that generally corresponds to the configuration of the rear edge of the bottom portion 31 of the shutter. Further, the slide surface portion 40 is again shown to extend between height determining portions 41a and 41b provided at front and rear corners, respectively, of the undersurface 4a, and being indicated by dot-dash shading on FIG. 18. The slide surface portion 40 is recessed relative to at least the height determining portions 41b adjacent the back of the casing 2. The front height determining portions 41a are provided with left-side and right-side cassette positioning holes 42a and 43a, and the rear height determining portions 41b are provided with left-side and right-side cassette positioning holes 42b and 43b, respectively. As in the earlier described embodiment of the invention, in the shutter-type tape cassette 1', the height determining portions 41a and 41b may all be in a common plane or the plane of the height determining portions 41a at the front of the cassette may be different from that of the rear height determining portions 41b at the back of the cassette provided that positioning pins engageable in the holes 42a and 43a are at correspondingly different heights from the positioning pins engageable with the holes 32b and 43b, as previously described.

The bottom portion 31 of the shutter 30 is formed with reel access holes 33, a laterally elongated opening 34 and a rectangular coupling hole 35 at lateral positions corresponding to the access openings 12, the IC memory terminal 18 and the reel lock releasing hole 17, respectively, provided in the bottom wall 4A of the casing 2. In the second embodiment of the invention being here described, the reel access holes 33 are elongated parallel to the directions of movement of the shutter 30 so that the hubs 6a of the reels rotatable within the casing 2 are exposed at the access holes 33 both in the closed position (FIGS. 15 and 17) and the opened position (FIG. 18) of the shutter 30. With the foregoing arrangement, the lower end of each hub 6a can project through the respective access opening 12 below the undersurface 4a of the bottom wall 4A of the casing without engaging the upper surface of the bottom portion 31 of the shutter. In other words, when the tape cassette 1' is not in use the downwardly projecting lower ends of the reel hubs 6a are received in the access holes 33 which, by reason of their elongation, do not interfere at all with the sliding movement of the shutter 30 between its opened and closed positions. It will be appreciated that the shutter 30, being formed of a synthetic resin, may be readily formed with a thickness greater than the thickness of the metal shutter 20 in the first described embodiment so as to accommodate the downwardly projecting lower end portions of the hubs 6a within the thickness of the bottom portion 31.

The coupling hole 35 of the shutter 30 is adapted to receive the reel lock releasing member 53 extending from the chassis 50A of a recording and/or reproducing device 50, which may be as previously described, and with which the tape cassette 1' is intended to be used. Here again, when the base portion 53b of the member 53 is engaged in the coupling hole 53 in response to the cassette 1' being disposed in its operative or loaded position, the shutter 30 is thereby securely maintained in its opened position.

The front edge of the bottom portion 31 of the shutter 30 is molded or otherwise formed with pairs of cut-outs 36, and abutments 37 and 38 which correspond to the cut-outs 26 and abutments 27 and 28, respectively, of the lid 20 in the first described embodiment. As shown in FIG. 15, the shutter 30 has a transparent window portion 30a formed therein and dimensioned so that, in the closed position of the shutter 30, the window portion 30a is approximately coextensive with the downwardly facing opening of the recess 7. By reason of such window portion 30a, the run of the tape 5 extending across the recess 7 can be readily viewed for determining if there is any undesirable slack therein. Although only the window portion 30a of the shutter 30 is described as being formed of a transparent resin, it will be understood that, if desired, the entire shutter 30 may be formed of a transparent resin for simplifying the manufacture of the shutter 30 and thereby reducing its cost. As in the first described embodiment of the invention, the shutter 30 is biased toward its closed position by a spring 39.

As earlier noted, apart from the differences described above in respect to the shutters 20 and 30, respectively, all other elements of the tape cassettes 1 and 1' are substantially the same and for the sake of brevity, further detailed descriptions of such identical structures and of the operation thereof are omitted.

Since in the tape cassettes 1 and 1' according to the first and second embodiments of the invention, the height determining portions 41a and 41b of the undersurface of the cassette casing 2, the cassette positioning holes 42a, 42b, 43a and 43b, and the resilient latching fingers 45 are the same, the tape cassettes 1 and 1' can be interchangeable used in connection with the same recording and/or reproducing device 50 including the previously described reel tables 51, lock releasing member 53 and cassette holder 56. In other words, without altering the configurations of the casing 2 and lid 10 of the cassette 1 or 1', either the metal shutter 20 of the first embodiment or the synthetic resin shutter 30 of the second embodiment can be employed with the standard casing 2 and lid 10 even though the thicknesses of the shutters 20 and 30 are quite different from each other. By reason of the foregoing, substantial freedom is achieved in the design and manufacture of DAT cassettes.

Since the same cassette casing 2 and lid 10 may be used with either type of shutter, the metal shutter 20 may be employed for premium grade tapes so as to provide an enhanced appearance to the cassette. The raised or offset margins 26a integrally formed along the edges of the cutouts 26 of the metal shutter 20 reduce the clearance between the metal shutter 20 and the undersurface 4a of the bottom wall 4A of the casing, and thereby restrict the passage ambient air through such clearance for preventing dust and other contaminants from entering the interior of the cassette casing.

On the other hand, in the case of cassettes for normal grade tapes, a shutter of synthetic resin may be employed, for example, so as to reduce the cost of manufacture thereof. Since the reel access holes 33 in the shutter 30 are in the form of elongated holes into which the lower ends of the hubs 6a may extend, smooth sliding movement of the shutter 30 on the surface 40 of the casing 2 is ensured to make possible the smooth opening and closing of the downwardly facing opening from the recess 7.

It will further be noted that, although the above described embodiments of the invention are stated to be applied to DAT cassettes, the present invention may be similarly advantageously utilized in any other shutter type cassette device, such as, video cassettes, audio cassettes, cassette-type ink ribbon cartridges and the like. Further, although the described tape cassettes 1 and 1' each have a single pivoted lid 10 which, in its closed position, substantially closes the forwardly facing opening from the recess 7, with the top of such recess being permanently closed by the forward portion of the top wall 3, the single lid 10 may be replaced by a lid assembly that includes a front lid and a top lid. As is well known, in cassettes having such lid assembly, the forward edge portion of the top wall 3 of the casing is cut back so that the recess 7 then also has an opening facing upwardly therefrom and, in the closed position of the lid assembly, the front lid and the top lid respectively close the forwardly facing and upwardly facing openings from the recess 7, while the shutter 20 or 30 closes the downwardly facing opening from the recess 7 as previously described.

Although illustrative embodiments of the invention have been described in detail herein with reference to the accompanying drawings, it will be understood that the invention is not limited to those precise embodiments, and that various changes and modifications may be effected therein by one skilled in the art without departing from the scope or spirit of the invention as defined in the appended claims.

What is claimed is:

1. A tape cassette, comprising:

a substantially rectangular box-shaped casing including top and bottom walls, peripheral walls extending between said top and bottom walls at the back and sides of the casing and a partition defining a recess located in a front portion of said casing and which has openings facing forwardly and downwardly from the recess;

a lid pivotally mounted on said casing for movements between a closed position extending across said opening facing forwardly from the recess and a raised opened position uncovering the forwardly facing opening;

a pair of reels rotatable within said casing;

a tape wound about said reels and extending therebetween in a path including a run extending across said forwardly facing opening so as to be disposed in back of said lid in said closed position of the latter;

a shutter extending across an undersurface of said bottom wall and being slidably movable relative to the latter between a closed position in which said shutter closes said opening facing downwardly from said recess and an opened position uncovering said opening facing downwardly from the recess;

retaining means for holding said shutter in each of said opened and closed positions including upstanding abutments at a front edge of said shutter and latching fingers integral with said bottom wall and extending generally parallel to a direction in which said shutter is slidably movable, said latching fingers having stop surfaces facing forwardly and rearwardly, respectively, for selective engagement with said abutments on the shutter so as to hold the shutter in said closed position or said opened position, respectively, said latching fingers being resiliently rockable in opposite directions relative to said bottom wall for selectively freeing said forwardly and rearwardly facing stop surfaces from said abutments on the shutter, each of said latching fingers including first and second elongated elements extending side-by-side and joined to each other at one end, the other end of said first element being joined to said bottom wall and the other end of said second element projecting beyond said other end of said first element and terminating in a laterally offset portion, and said stop surfaces being respectively situated on said laterally offset portion at said other end of the second element and on said one end of said first element; and means integral with said latching fingers for rocking the latter in said opposite directions upon insertion and removal of the cassette into and from a holder therefor so that the shutter is freed to be moved to said opened position upon insertion of the cassette in said holder and the shutter is freed to be returned to said closed position upon removal of the cassette from said holder, said means for rocking the latching fingers in opposite directions including cam formations on said second element of each of the latching fingers.

2. A tape cassette as in claim 1; wherein said shutter has a cutout in a forward edge portion for each of said latching fingers, each said cutout being disposed to receive said cam formations of the respective latching finger, and said shutter further has an offset margin around each said cutout for reducing the clearance between said offset margin and the undersurface of said bottom wall.

3. A tape cassette as in claim 1; wherein said shutter is of sheet metal and said upstanding abutments are constituted by upwardly bent edge portions of said sheet metal.

4. A tape cassette, comprising:

a substantially rectangular, box-shaped casing including top and bottom walls, peripheral walls extending between said top and bottom walls at the back and sides of the casing and a partition defining a recess located in a front portion of said casing and which has openings facing forwardly and downwardly from the recess;

a lid pivotally mounted on said casing for movements between a closed position extending across said opening facing forwardly from the recess and a raised opened position uncovering the forwardly facing opening;

a pair of reels rotatable within said casing;

reel locking means in said casing for preventing rotation of said reels when the cassette is not in use, said bottom wall of the casing having an opening for access to said reel locking means by a lock releasing member;

a tape wound about said reels and extending therebetween in a path including a run extending across said forwardly facing opening so as to be disposed in back of said lid in said closed position of the latter;

a shutter extending across an undersurface of said bottom wall and being slidably movable relative to the latter between a closed position in which said shutter closes said opening facing downwardly from said recess and an opened position uncovering said opening facing downwardly from the recess, said shutter having an opening which, in said opened position of the shutter, is aligned with said opening in the bottom wall so that said lock releasing member, when inserted through said opening in the bottom wall for releasing said reel locking means, also engages in said opening of the shutter for locking the latter in said opened position;

retaining means for holding said shutter in each of said opened and closed positions including upstanding abutments at a front edge of said shutter and latching fingers integral with said bottom wall and extending generally parallel to a direction in which said shutter is slidably movable, said latching fingers having stop surfaces facing forwardly and rearwardly, respectively, for selective engagement with said abutments on the shutter so as to hold the shutter in said closed position or said opened position, respectively, said latching fingers being resiliently rockable in opposite directions relative to said bottom wall for selectively freeing said forwardly and rearwardly facing stop surfaces from said abutments on the shutter; and means integral with said latching fingers for rocking the latter in said opposite directions upon insertion and removal of the cassette into and from a holder therefor so that the shutter is freed to be moved to said opened position upon insertion of the cassette in said holder and the shutter is freed to be returned to said closed position upon removal of the cassette from said holder.

* * * * *